(12) United States Patent
Isometsä et al.

(10) Patent No.: US 6,524,227 B1
(45) Date of Patent: Feb. 25, 2003

(54) ROLL THAT CAN BE BENT FOR A WEB-LIKE MATERIAL

(75) Inventors: Juha Isometsä, Jyväskylä (FI); Tuomo Kurkela, Haukipudas (FI); Jorma Snellman, Jyväskylä (FI); Pekka Kivioja, Muurame (FI); Mauri Rukajärvi, Oulu (FI); Esa Vilmusenaho, Jyväskylä (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/485,976

(22) PCT Filed: Aug. 11, 1998

(86) PCT No.: PCT/FI98/00623

§ 371 (c)(1),
(2), (4) Date: May 22, 2000

(87) PCT Pub. No.: WO99/09329

PCT Pub. Date: Feb. 25, 1999

(30) Foreign Application Priority Data

Aug. 19, 1997 (FI) .................................................. 973388
Jan. 15, 1998 (FI) .................................................. 980071

(51) Int. Cl.⁷ ............................. B29C 43/46; B25F 5/02
(52) U.S. Cl. ................................. 492/7; 492/8; 492/47
(58) Field of Search ........................ 492/53, 7, 6, 8, 492/16, 5, 47, 60; 310/90.5; 100/162 B, 170, 172; 72/238, 239

(56) References Cited

U.S. PATENT DOCUMENTS

| | | | | |
|---|---|---|---|---|
| 1,848,547 A | * | 3/1932 | Scharnberg | 100/170 |
| 2,676,387 A | * | 4/1954 | McArn | 492/15 |
| 2,771,658 A | * | 11/1956 | Morrill | 492/16 |
| 2,898,662 A | * | 8/1959 | Robertson | 492/5 |
| 2,955,897 A | * | 10/1960 | Noe | 100/170 |
| 2,960,749 A | * | 11/1960 | Robertson et al. | 492/20 |
| 3,085,503 A | * | 4/1963 | Moore | 100/90 |
| 3,094,771 A | * | 6/1963 | Robertson | 492/7 |
| 3,168,435 A | * | 2/1965 | Beachler | 100/162 B |
| 3,182,787 A | * | 5/1965 | Lorenz | 198/824 |
| 3,347,157 A | * | 10/1967 | Kemp | 100/170 |
| 3,373,588 A | * | 3/1968 | Stone | 72/245 |
| 3,443,295 A | * | 5/1969 | Denoyer et al. | 492/6 |
| 3,448,683 A | * | 6/1969 | Seanor et al. | 100/170 |
| 3,537,665 A | * | 11/1970 | Shumaker | 242/914 |
| 3,604,087 A | * | 9/1971 | Beck | 492/6 |
| 3,672,018 A | * | 6/1972 | Junk et al. | 492/7 |
| 3,745,625 A | * | 7/1973 | Jaegers et al. | 492/406 |
| 4,011,938 A | * | 3/1977 | Kain | 198/824 |
| 4,128,280 A | * | 12/1978 | Purtschert | 384/107 |
| 4,180,296 A | * | 12/1979 | Habermann | 310/90.5 |
| 4,230,475 A | * | 10/1980 | Dunk | 492/15 |
| 4,364,158 A | * | 12/1982 | Bainton | 492/7 |
| 4,372,205 A | * | 2/1983 | Pflaum | 101/153 |
| 4,438,695 A | * | 3/1984 | Maier et al. | 101/375 |
| 4,470,183 A | * | 9/1984 | Kuosa | 492/7 |
| 4,510,865 A | * | 4/1985 | Molinatto | 101/153 |
| 5,048,411 A | * | 9/1991 | Siebert | 100/168 |
| 5,152,041 A | * | 10/1992 | Link et al. | 100/170 |
| 5,495,798 A | * | 3/1996 | Niskanen et al. | 100/170 |
| 5,645,355 A | * | 7/1997 | Tokushima et al. | 384/133 |
| 5,662,950 A | * | 9/1997 | Kusago | 100/168 |
| 5,730,692 A | * | 3/1998 | Grabscheid | 492/7 |
| 5,739,609 A | * | 4/1998 | Ueyama et al. | 310/90.5 |
| 5,846,173 A | * | 12/1998 | Grabshield et al. | 492/7 |

FOREIGN PATENT DOCUMENTS

DE          38 26 980 A1    *    8/1987

* cited by examiner

*Primary Examiner*—Gregory M. Vidovich
*Assistant Examiner*—Marc Jimenez
(74) *Attorney, Agent, or Firm*—Steinberg & Raskin, P.C.

(57) ABSTRACT

A roll that can be bent for a web-like material, which roll comprises a continuous tubular roll mantle (11) of composite material as well as axle journals (12) connected to each end of the roll mantle (11). The axle journals (12) are attached by means of at least one mechanism (30), by whose means the axle journals (12) and thereby the roll mantle (11) are bent into an arc form, and a regulation device (40) by whose means the angular position of the roll arc can be regulated.

21 Claims, 15 Drawing Sheets

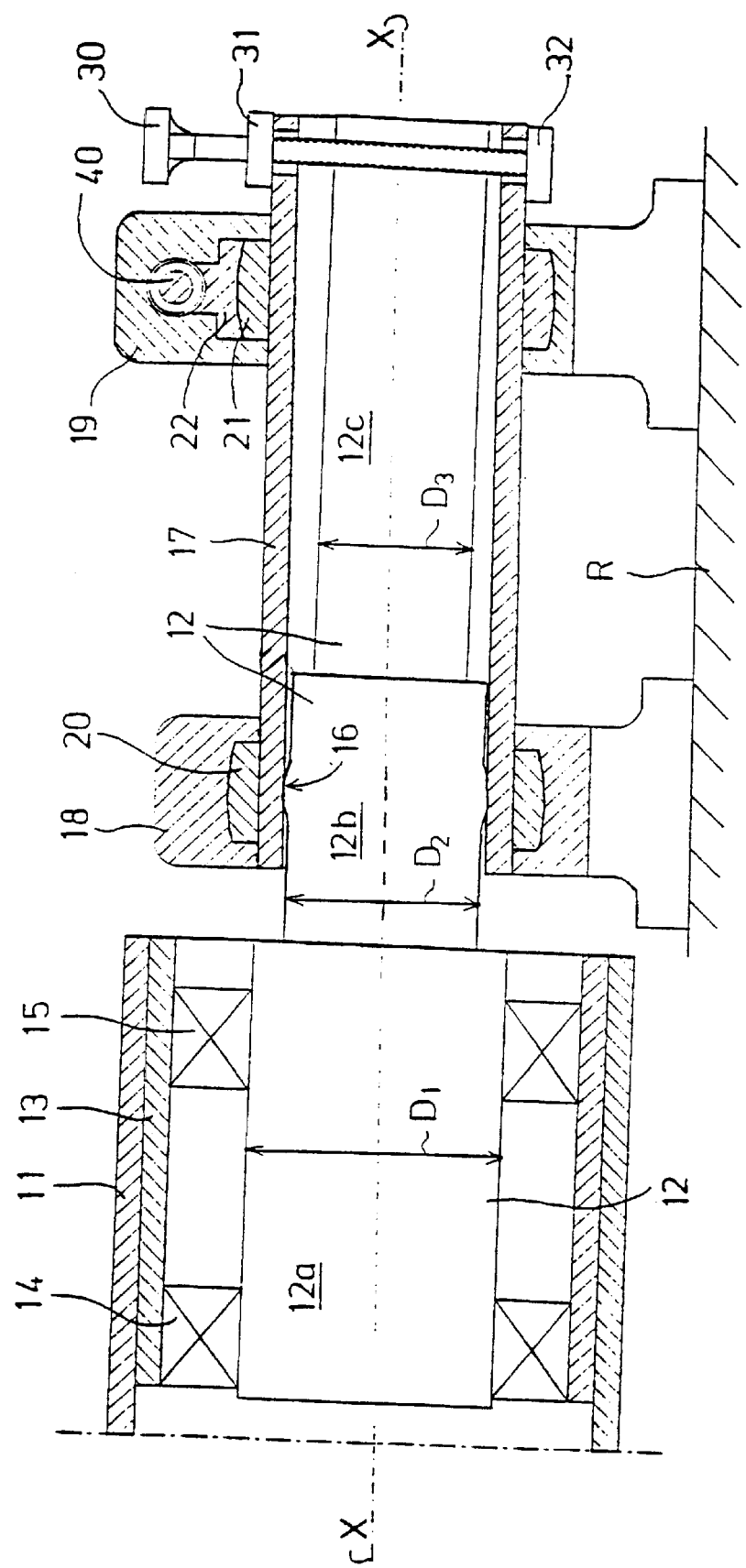
F I G. 2

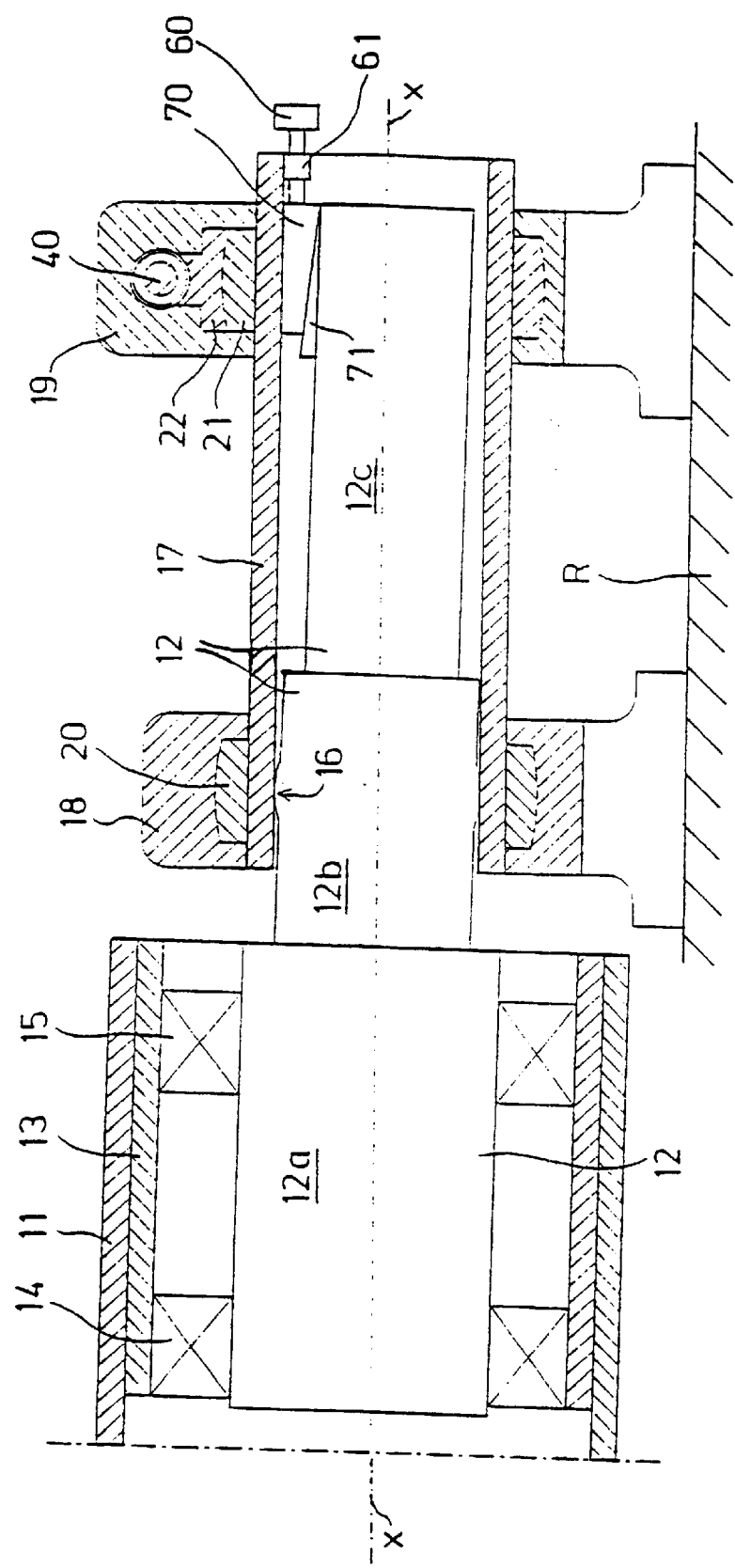
F I G. 5

ROLL THAT CAN BE BENT FOR A WEB-LIKE MATERIAL

FIELD OF THE INVENTION

The present invention relates to a roll, and in particular, to a roll for a web like material.

BACKGROUND OF THE INVENTION

Most commonly, rolls that can be bent have been formed so that they have a continuous axle and a roll mantle composed of a number of parts fitted on the axle. The roll can be curved in the desired shape by shifting the outermost journalling points of the roll mantle in the radial direction, in which case the mantle forms an arc or a broken line. The parts of the mantle have as a rule, been mounted on the axle each of them separately, in which case the arrangement comprises a number of bearings. The conventional solutions often involve problems, which include, among other things, bearing problems in the roll and heat peaks produced by the bearings in the paper web. A roll mantle composed of a number of parts may also form a considerable problem, because the gaps between the parts may mark the paper web and because the shape of the arc of the roll is not optimal, but the shape line of the roll is shaped as a broken line. Further, owing to the metallic roll mantle, problems of corrosion may arise.

The roll described in the applicant's FI Utility Model No. 2788 comprises a non-revolving roll axle and a roll mantle mounted on the axle revolving by means of bearings. The roll mantle is a continuous tubular mantle, and the roll axle consists of three parts linked with each other. The inner ends of the two end parts of the roll axle, which are hollow in the interior, extend a certain distance into the interior of the hollow tubular middle part of the axle. In the end areas of the roll, support sleeves have been fitted, onto which sleeves the roll mantle itself has been mounted. The roll mantle has been mounted on each of the end parts of the axle by the intermediate of said support sleeves by means of two bearings placed at an axial distance from one another. The end parts of the axle have been connected with the middle part of the axle by means of articulated members so that the end parts of the axle can be inclined in relation to the middle part of the axle. The inclining takes place so that the end parts of the axle move in relation to the middle part of the axle in the radial direction. The roll bending mechanism comprises a cam member which forms a lever with two arms and which has been mounted pivotally on the wall of the tubular end part. The inner end of the cam member extends through the wall of said tubular end part to outside the end part and is supported against the inner face of the middle part. In the interior of the tubular end part, an axially displaceable regulation rod has been fitted, whose inner end is supported against the cam member. When the cam member is shifted in the axial direction, the cam member can be pivoted so that it is supported with a greater force against the inner face of the middle part of the axle while, at the same time, increasing the distance between the end part and the middle part of the axle at the side of the cam member, in which case the axle is bent. The roll mantle can be made of steel or of a composite material.

The solution described in said FI Utility Model No. 2788 is in itself operative, but it is relatively complicated and expensive.

The roll described in the applicant's FI Patent Application No. 970379 is composed of two end parts and of a middle part. In this solution, the roll has no separate axle with a mantle revolving on said axle, but the middle part also operates as the axle of the roll, which is mounted on its support members by means of end bearings. The extensions of the middle part which operates as the axle have diameters substantially smaller than the diameter of the middle part, and their size corresponds to the diameter of an ordinary non-revolving axle. The end parts of the roll are tubular pieces, and they have been mounted directly on extensions of the middle part so that, at the inner ends of the end parts, articulation means have been fitted in the interior of the tubular end parts. The tubular end parts have been supported in the axial direction, in the area of their outer ends, by means of bearings, which have been fitted on support parts separate from the revolving parts. The support parts comprise sleeve-like pieces, whose inner diameter is larger that the diameter of the extension of the middle part, so that the positions of the bearings can be regulated radially. When the positions of the bearings of the tubular end parts are regulated, it is possible to regulate both the extent of curve form of the roll and the direction of the curve form. As the material of the mantle of this roll, it is also possible to use a composite material.

In said FI Patent Application No. 970379, an axle is used that extends through the roll mantle, and the whole of the construction of the roll is relatively complex, so that the cost of the roll becomes high.

In the FI Patent Application No. 951288, a roll is described that is provided with a continuous roll mantle or with a roll mantle composed of a number of parts. The material of the roll mantle is reinforced plastic or a similar composite construction. The roll is provided with a continuous support axle extending across the whole roll mantle, which axle is not rotated and which is supported in its place. In the middle portion of the support axle there is a thicker portion, on which the middle bearings of the roll have been mounted. Said bearings are supported on annular fitting pieces, by whose means the outer race of the bearing is supported on the roll mantle. At the ends of the roll, sleeves have been installed so that the sleeves extend a certain distance into the interior of the roll mantle and a certain distance to outside the roll mantle. The ends of the roll mantle have been journalled on said sleeves. Onto the sleeves, in the portion outside the roll mantle, regulation screws have been mounted, by whose means the sleeve can be diverted from the centre line formed by the support axle. When the sleeves are diverted from the centre line formed by the support axle, at the same time the centres of the outermost bearings of the roll are diverted from said centre line, in which case the roll mantle is bent, but the support axle remains straight all the time.

In said FI Patent Application No. 951288, a continuous support axle is used which extends through the whole roll mantle and in whose middle part there is a thicker portion. Thus, the roll becomes relatively expensive and heavy. Further, the roll has bearings also in the middle portion of the roll at the thicker portion of the support axle. These bearings fitted in the middle part of the roll cause said problems of heat in the roll mantle, and attempts have been made to reduce said problems of heat by means of annular fitting pieces installed between the outer races of the bearings and the inner face of the roll mantle.

In the EP Patent Application No. 363,887, a roll made of a composite material has been described. The invention of said EP patent application concerns the structures and materials of different surface layers of the roll mantle. FIG. 4 illustrates a revolving roll manufactured in accordance with the invention and meant for very high speeds, which roll is provided with a roll mantle of a composite material and with axle journals at the ends of the roll mantle. The axle journals are connected with the roll mantle by means of end flanges. Said EP patent application is expressly concerned with the material structure of the roll mantle, the object being to manufacture a roll of sufficient surface hardness, low weight, and high dimensional precision. The application does not mention bending of the roll.

Owing to its numerous advantageous properties, a composite roll is highly interesting. The roll solutions mentioned above, in which a roll mantle made of a composite material can also be employed, are, however, clumsy and expensive. Owing to the favourable material properties of a composite roll, such as modulus of elasticity and density, a composite roll can be dimensioned so that it can be bent to the desired curve form with a reasonable torque and that it operates either at a speed below the critical speed, i.e. below the lowest resonance frequency, or between resonance frequencies. If a steel roll is supposed to be bent to a required curve form without increasing the strains excessively, the roll diameter must be very small. In such a case, one or several critical speeds of the roll must be surpassed unavoidably.

With a steel roll, the bending torque required by the bending is also considerably higher than with a composite roll, in which case the bearing forces at a steel roll are also considerably higher than with a composite roll.

OBJECTS AND SUMMARY OF THE INVENTION

The solution in accordance with the present invention constitutes a substantial improvement over the prior-art rolls that can be bent.

In the roll in accordance with the present invention, there is a continuous tubular roll mantle of a composite material. At both ends of the roll mantle there are axle journals, by whose means the roll is attached to the frame of the machine. Thus, the roll has no axle passing through the roll at all. As compared with traditional spreader rolls, the construction of the roll in accordance with the present invention is clearly simpler, and its need of maintenance is little. The simple construction makes the manufacture of the roll easy and of low cost. Also, the simple construction facilitates servicing of the roll.

BRIEF DESCRIPTION OF THE DRAWINGS

In the following, the invention will be described with reference to the figures in the accompanying drawings, the invention being however, not supposed to be confined to the details of said illustrations alone.

FIG. 2 is a schematic illustration of an embodiment of the roll in accordance with the invention in which the bearings are fitted in the interior of the roll mantle and in which the bending mechanism is a screw member.

FIG. 5 shows a third variation of the embodiment shown in FIG. 2.

DETAILED DESCRIPTION OF THE INVENTION

Figure 1:
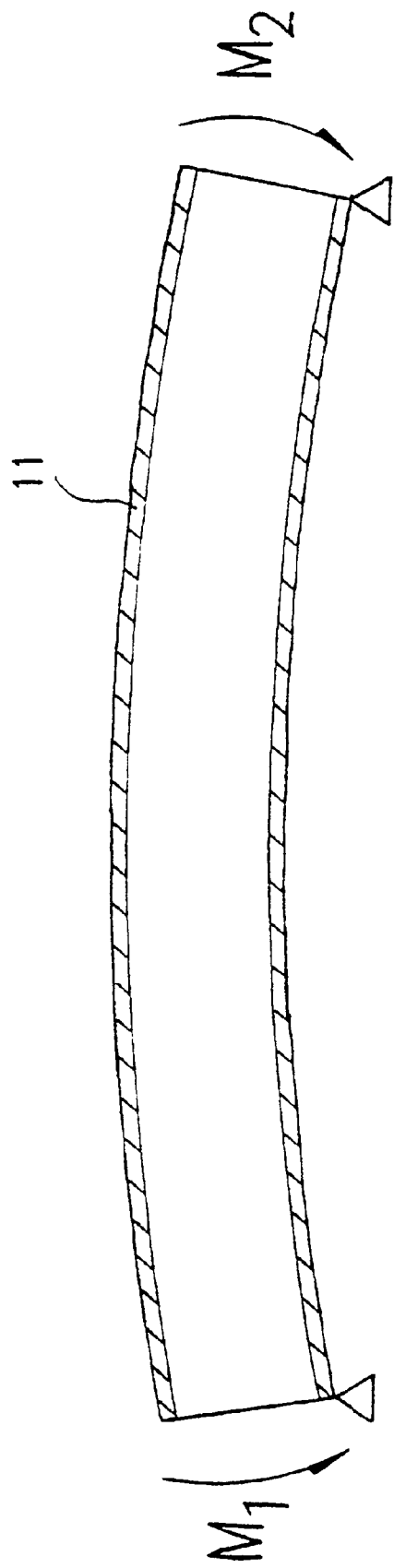
FIG. 1 is a schematic illustration of principle, in which a continuous tubular roll mantle is be means of a torque applied to both ends of the roll mantle.

FIG. 1 is an illustration of principle, in which the roll mantle 11 is bent by means of torques $M_1$, $M_2$ applied to both ends of the roll mantle 11. The magnitude of the torque $M_1$ can be different from the magnitude of the torque $M_2$, in which connection the running of the web proceeding on the roll mantle 11 can be controlled in the axial direction of the roll.

FIG. 2 shows an embodiment of the roll in accordance with the invention. In the figure, one end area of the roll is illustrated. The roll consists of a continuous tubular roll mantle 11 of a composite material, which mantle has been fitted to revolve on the axle journals 12. In the end areas of the roll mantle, the first support sleeves 13 have been fitted, on which sleeves the roll mantle 11 itself has again been mounted. The roll mantle 11 has been mounted on axle journals 12 by the intermediate of said first support sleeves 13 by means of bearings 14,15. The bearings 14,15 have been installed at a distance from one another in the axial X—X direction of the roll, and, thus, the bearings form a pair of bearings.

In FIG. 2, the axle journals 12 consist of three parts 12a, 12b, 12c, all of which have different diameters. The inner part 12a, which extends into the interior of the end area of the roll mantle 11, has the largest diameter $D_1$, the following middle part 12b, which is directed outwards from the end of the roll mantle 11, has a slightly smaller diameter $D_2$, and the outer part 12c, which follows after the middle part 12b, has again a somewhat smaller diameter $D_3$ than the middle part 12b. The axle journals 12 can, of course, be physically composed of the same piece, in which case said parts 12a, 12b, 12c have been formed, for example, by turning on a lathe. In the middle area of the middle part 12b of the axle journal 12, there is a projection 16, which extends around the circumference of the axle journal and which forms an articulation member. Onto the outer part 12c of the axle journal and partly onto the middle part 12b, a second support sleeve 17 has been fitted. This second support sleeve 17 extends beyond the projection 16 provided on the middle part 12b of the axle journal 12, and the inner diameter of the second support sleeve 17 is substantially equal to the outer diameter of the projection 16. The second support sleeve 17 has been fixed to the frame R of the machine by means of two fastening members 18, 19. The first fastening member 18 is placed at the projection 16, and the second fastening member 19 is placed at a distance from the outer end of the outer part 12c of the axle journal 12 and of the second support sleeve 17.

In FIG. 2, bending of the roll into curve form takes place by means of a bending mechanism 30 acting upon the outer end of the outerpart 12c of the axle journal 12. In this embodiment, the bending mechanism 30 consists of a screw member 30 extending through the end of the second support sleeve 17 and through the outer end of the outer part 12c of the axle journal 12. The screw member 30 is provided with an outer threading extending substantially through the second support sleeve 17, and the bore which extends through the outer part 12c of the axle journal 12 and which receives the screw member 30 is provided with a corresponding inner threading. Further, movement of the screw member 30 in the direction of its own longitudinal axis is prevented by means of fastening members 31,32 supported against the outer face of the support sleeve 17 and attached to the screw member 30, for example, by means of cotter pins. When the screw member 30 is rotated, the axle journal 12 is bent, and the articulation member 16 permits axial shifting of the axle journal 12 in relation to the second support sleeve 17. When the axle journals 12 at both ends of the roll mantle 11 are bent, the roll mantle 11 is also bent to the desired curve form.

In FIG. 2, by means of the regulation device 40, the second support sleeve 17 can be rotated in the direction of its circumference. When the second support sleeve 17 is rotated in the direction of the circumference, the screw member 30 and so also the axle journal 12 are rotated correspondingly. Thus, by means of the screw member 30, the desired curve form is regulated for the roll mantle 11, and by means of the regulation device 40 the direction of the curve form of the roll mantle 11 is regulated in the direction of the circumference of the roll mantle 11. The second support sleeve 17 has been mounted in the first 18 and the second 19 fastening member so that it cannot be rotated in relation to the fastening members 18,19 in any other way except by the effect of the regulation device 40. This is why the axle journal 12 cannot be rotated in relation to the fastening members 18,19 either, except by the effect of the regulation device 40. The first fastening member 18 is provided with a first bearing member 20, which permits rotation and a slight axial movement of the second support sleeve 17. Also the second fastening member 19 is provided with a corresponding second bearing member 21, which permits a slight axial movement of the second support sleeve 17. This second bearing member 21 is locked with the support sleeve 17 so that the support sleeve 17 cannot be rotated in relation to the second bearing member 21 in the direction of the circumference. Further, the second bearing member 21 is coupled by means of an intermediate member 22 with the regulation device 40. Thus, by the intermediate of the intermediate member 22 and the second bearing member 21, the regulation device 40 acts upon the second support sleeve 17, in which connection the second support sleeve 17 revolves in the direction of the circumference by the effect of the regulation device 40.

Figure 3:
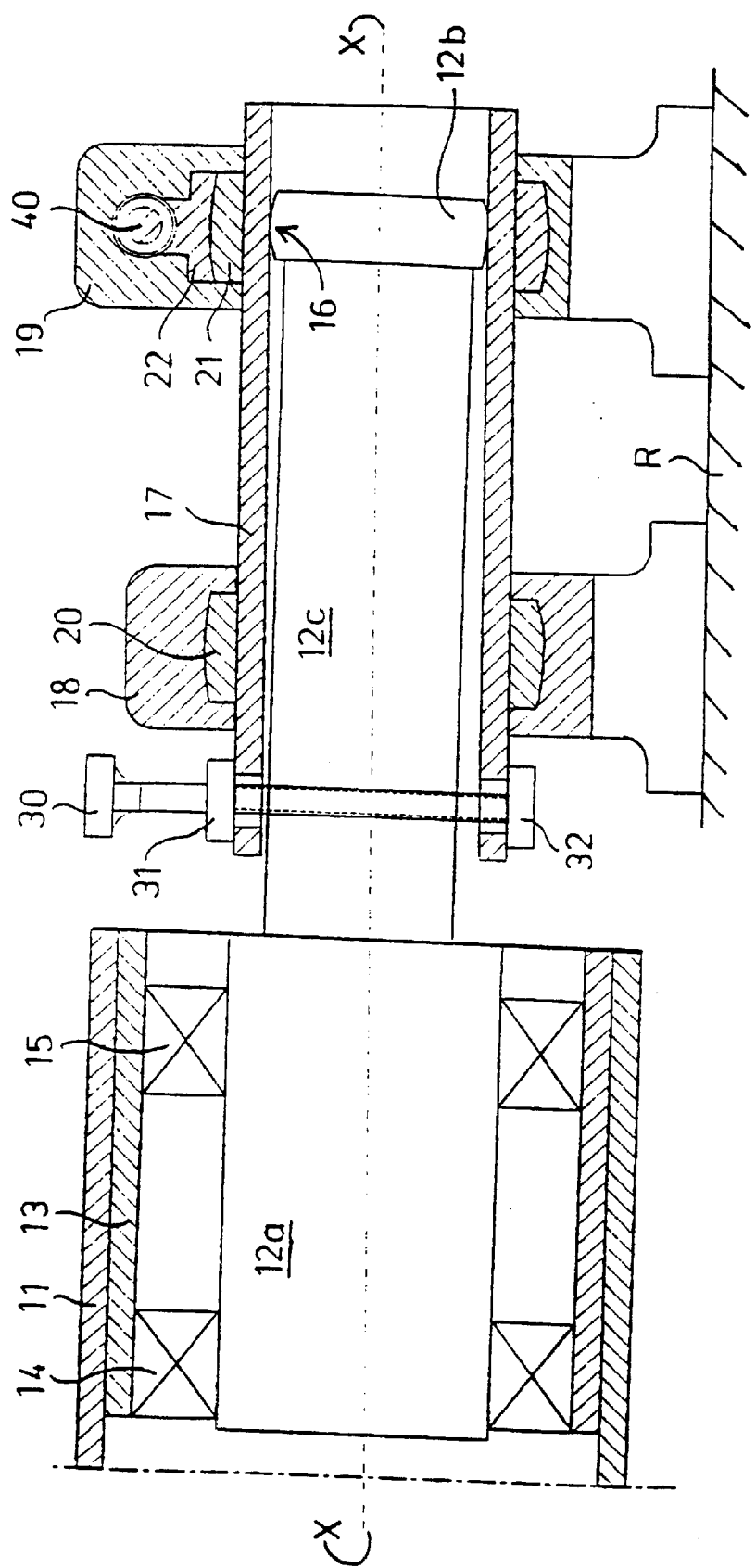
FIG. 3 shows a variation of the embodiment shown in FIG. 2.

In the following, the embodiments shown in FIGS. 3 through 14 will be described in the respects only in which they differ from the embodiment shown in FIG. 2. In FIGS. 3 . . . 14, the same reference numerals will be used for corresponding parts as have been used in FIG. 2.

FIG. 3 shows an embodiment in which the screw member 30 that bends the roll mantle into a curve form is placed between the first fastening member 18 and the end of the roll mantle 11, and not after the second fastening member 19 as is shown in the embodiment of FIG. 2. The parts 12b and 12c of the axle journal 12 change positions here, and the articulation point 16 is placed at the second fastening member 19.

Figure 4:
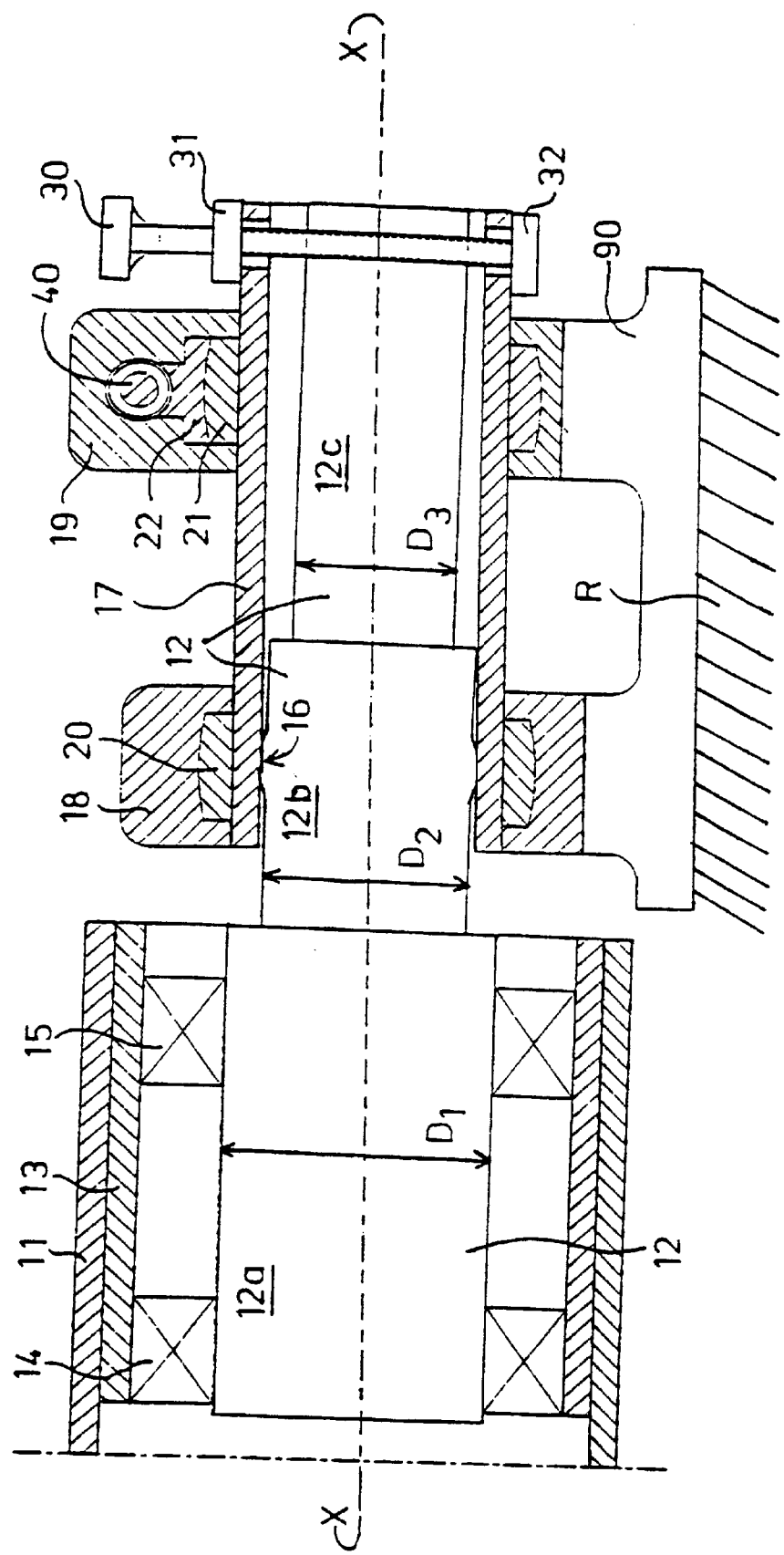
FIG. 4 shows a second variation of the embodiment shown in FIG. 2.

FIG. 4 shows an embodiment which differs from the embodiment of FIG. 2 in respect of the fastening members 18,19. In the embodiment of FIG. 2, two fully separate fastening members 18,19 have been used, by whose means the second support sleeve 17 fitted on the axle journals 12 has been attached to the frame R of the machine. In the embodiment shown in FIG. 4, a fastening flange construction is used in which there are two fastening members 18,19, which have a common lower part 90, which is attached to the frame R of the machine. Thus, the second support sleeve 17 is still attached to the flange construction by means of two fastening points, which flange is also possible to think that the top portion of the fastening flange construction is made of one piece.

FIG. 5 shows an embodiment which differs from the embodiment shown in FIG. 2 in respect of the roll bending mechanism. In this embodiment, the roll bending mechanism consists of a screw member 60 parallel to the axis X—X of the roll, provided with an outer threading, and placed at the outer end of the second support sleeve 17. The screw member 60 has been fitted in a fastening member 61, which is fixed to the inner face of the second support sleeve 17 at its outer end and which is provided with a bore with an inside threading that receives the screw member 60 and that is parallel to the axis X—X of the roll. The inner end of the screw member 60 is placed against the end face of a first wedge member 70. The first wedge member 70 moves substantially parallel to the axis X—X of the roll on the inner face of the second support sleeve 17 by the effect of the screw member 60, but it has been locked against the inner face of the second support sleeve 17 to prevent radial movement. The wedge face of this first wedge member 70 is again placed against the wedge face of the wedge member 71 attached to the outer part 12c of one of the axle journals 12. When the first wedge member 70 is displaced by means of the screw member 60 to the left in the figure onto the second wedge member 71, the axle journal 12 is bent, and so also the roll mantle 11 is bent.

Figure 6:
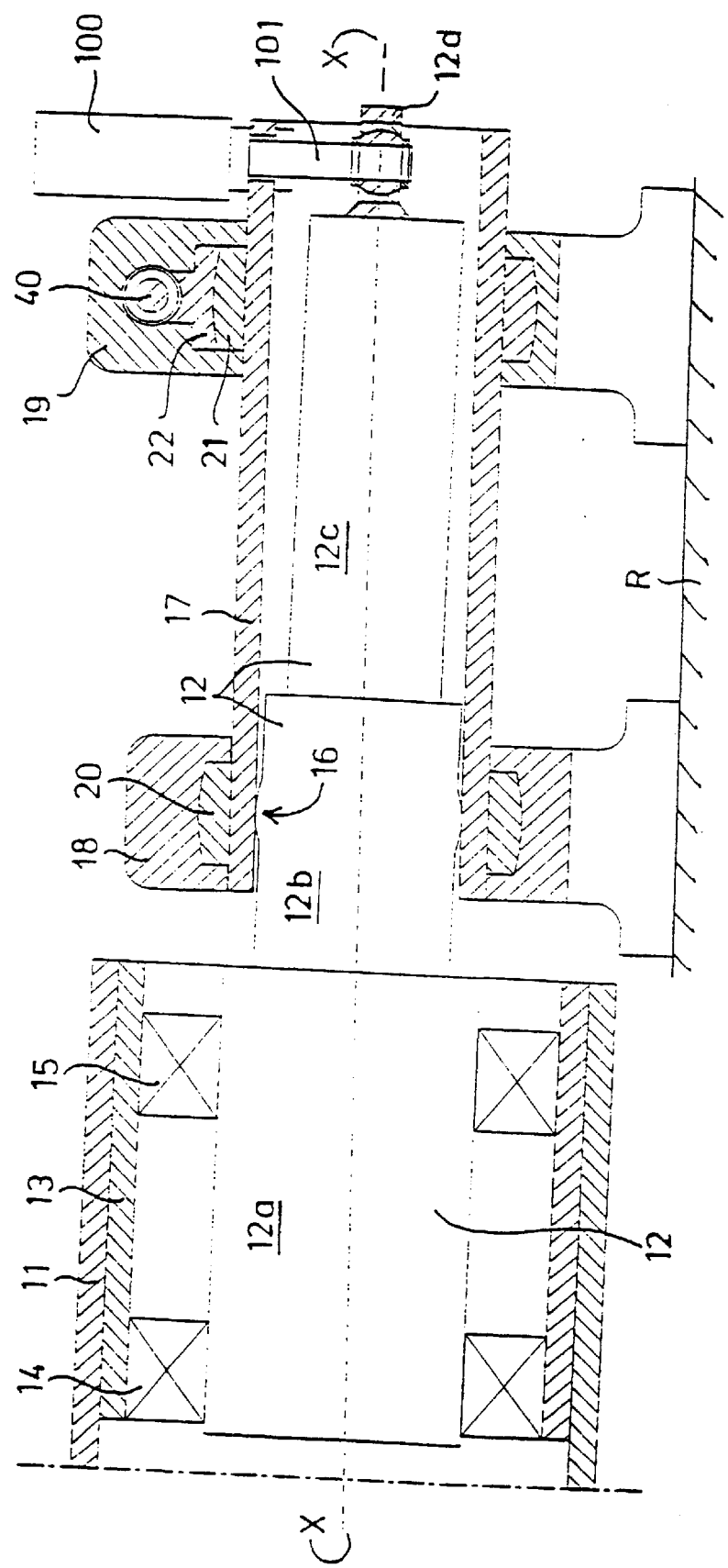
FIG. 6 shows a fourth variation of the embodiment shown in FIG. 2.

FIG. 6 shows an embodiment which differs from the embodiments shown in FIGS. 2 through 5 in respect of the bending mechanism. As the bending mechanism 100, a hydraulic or pneumatic cylinder or a stepping motor is used. The rod 101 of the cylinder or of the stepping motor has been attached to an extension 12d provided on the axle journal 12, and the cylinder or the motor has been attached to the second support sleeve 17. Thus, vertical movement of the rod 101 produces bending of the axle journal 12.

Figure 7:
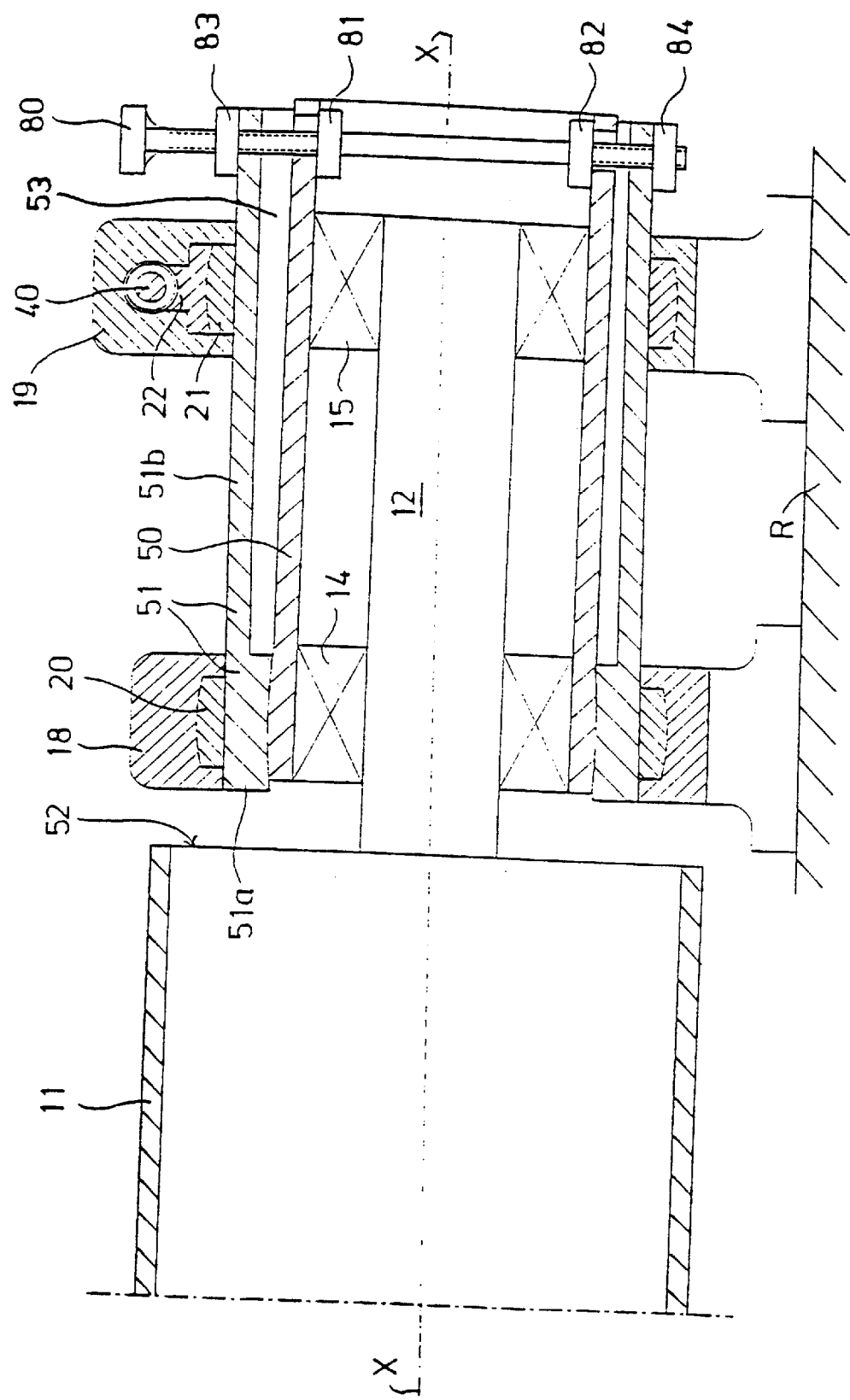
FIG. 7 is a schematic illustration of an embodiment of the roll in accordance with the invention in which the bearings are fitted outside the roll mantle and the bending mechanism is a screw member.

FIG. 7 is a schematic illustration of an embodiment of the roll in accordance with the invention, in which embodiment it is a difference as compared with the embodiments shown in FIGS. 2 through 6 that the bearings of rotation of the roll are now placed outside the roll mantle 11. In this embodiment, the axle journal 12 has been attached to the end member 52 of the roll, which end member is fixed to the roll mantle 11, in which case the axle journal 12 revolves along with the roll mantle 11. On the other hand, the axle journal 12 has been mounted revolving on a first support sleeve 50 by means of bearings 14,15. Here the axle journal 12 is of substantially uniform thickness at least in respect of its portion between said bearings 14,15. The first support sleeve 50 is surrounded by a second support sleeve 51, which has been attached to the frame R of the machine by means of fastening members 18,19, which are placed at said bearings 14,15 in the direction of the axis X—X of the roll. At the end of the second support sleeve 51 placed next to the end member 52, there is a thicker portion 51a which extends across the first fastening member 18 in the direction of the axis X—X of the roll. At the thicker portion 51a, the inner diameter of the second support sleeve 51 is smaller than the inner diameter of the extension part 51b following after the thicker portion 51a. Thus, between the first support sleeve 50 and the extension part 51b of the second support sleeve 51, an empty space 53 remains, in which the outer end of the first support sleeve 50 can move in the radial direction. The thicker portion 51a of the second support sleeve 51 forms an articulation member of the first support sleeve 50, on whose support a little movement between the first support sleeve 50 and the second support sleeve 51 in the direction of the axis X—X of the roll is possible.

In the embodiment shown in FIG. 7, the bending mechanism 80 also comprises a screw member 80 installed outside the second fastening member 19, which screw member extends both through the first support sleeve 50 and through the second support sleeve 51. On the contrary, the screw member 80 does not extend through the axle journal 12, which terminates at the second support bearing 15 before the screw member 80. The screw member 80 is provided with an outer threading substantially in the portions that pass through the first 50 and the second 51 support sleeves. Movement of the screw member 80 in the direction of its own longitudinal axis in relation to the first support sleeve 50 is prevented by means of first fastening members 81,82 resting against the inner face of the first support sleeve 50 and attached to the screw member 80, for example, by means of cotter pins. Further, to the outer face of the second support sleeve 51, second fastening members 83, 84 have been attached, which are provided with bores with inside threadings that receive the screw member 80.

In FIG. 7, bending of the axle journal 12 of the roll is produced so that the outer end of the first support sleeve 50 is displaced by means of the screw member 80 in relation to the second support sleeve 51. In such a connection, the centre point of the second outer bearing 15 is displaced in relation to the central axis X—X of the roll, in which case the axle journal 12 is bent, and the roll mantle 11 is also bent.

Figure 8:
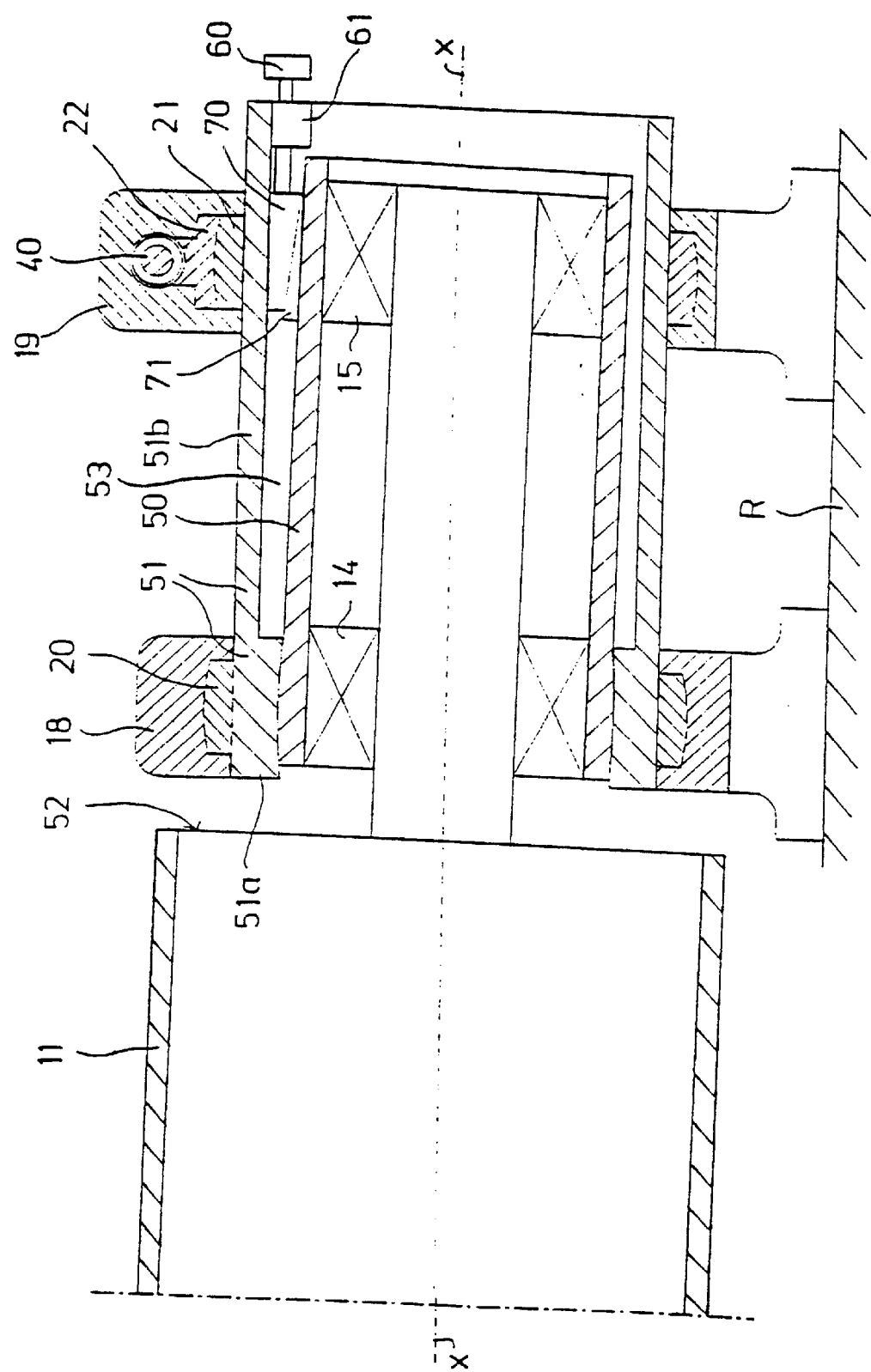
FIG. 8 shows a variation of the embodiment shown in FIG. 7.

FIG. 8 shows an embodiment which differs from the embodiment shown in FIG. 7 in respect of the roll bending mechanism. In this embodiment, a bending mechanism as described in the embodiment shown in FIG. 5 is used. Here the screw member 60 has been fitted in a fastening member 61, which has been attached to the inner face of the second support sleeve 51 at its outer end and which is provided with an inside threading that receives the screw member 60. In order that the fastening member 61 could be fitted on the inner face of the second support sleeve 51, the first support sleeve 50 is slightly shorter than the second support sleeve 51. Here the second wedge member 71 has been attached to the outer face of the first support sleeve 50, in which case, being controlled by the screw member 60, the wedge members 70,71 bend the first support sleeve 50.

Figure 9:
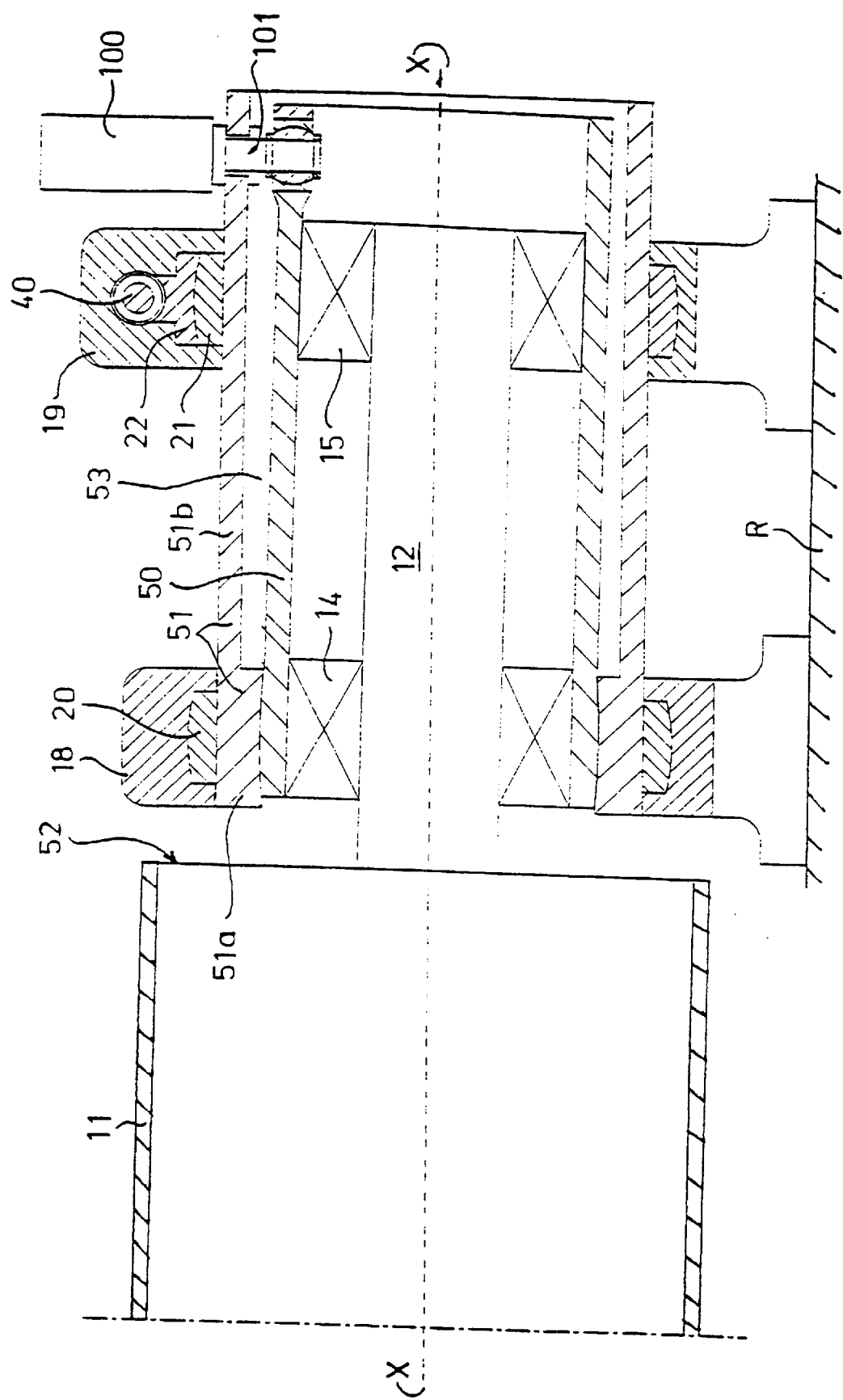
FIG. 9 shows a second variation of the embodiment shown in FIG. 7.

FIG. 9 shows an embodiment which differs from the embodiments shown in FIGS. 7 and 8 in respect of the roll bending mechanism. Herein a hydraulic or pneumatic cylinder or a stepping motor is used as the bending mechanism 100. The rod 101 of the cylinder or stepping motor has been attached to the first support sleeve, and the cylinder or stepping motor has been attached to the second support sleeve. Thus, vertical movement of the rod 101 produces bending of the axle journal 12.

Figure 10:
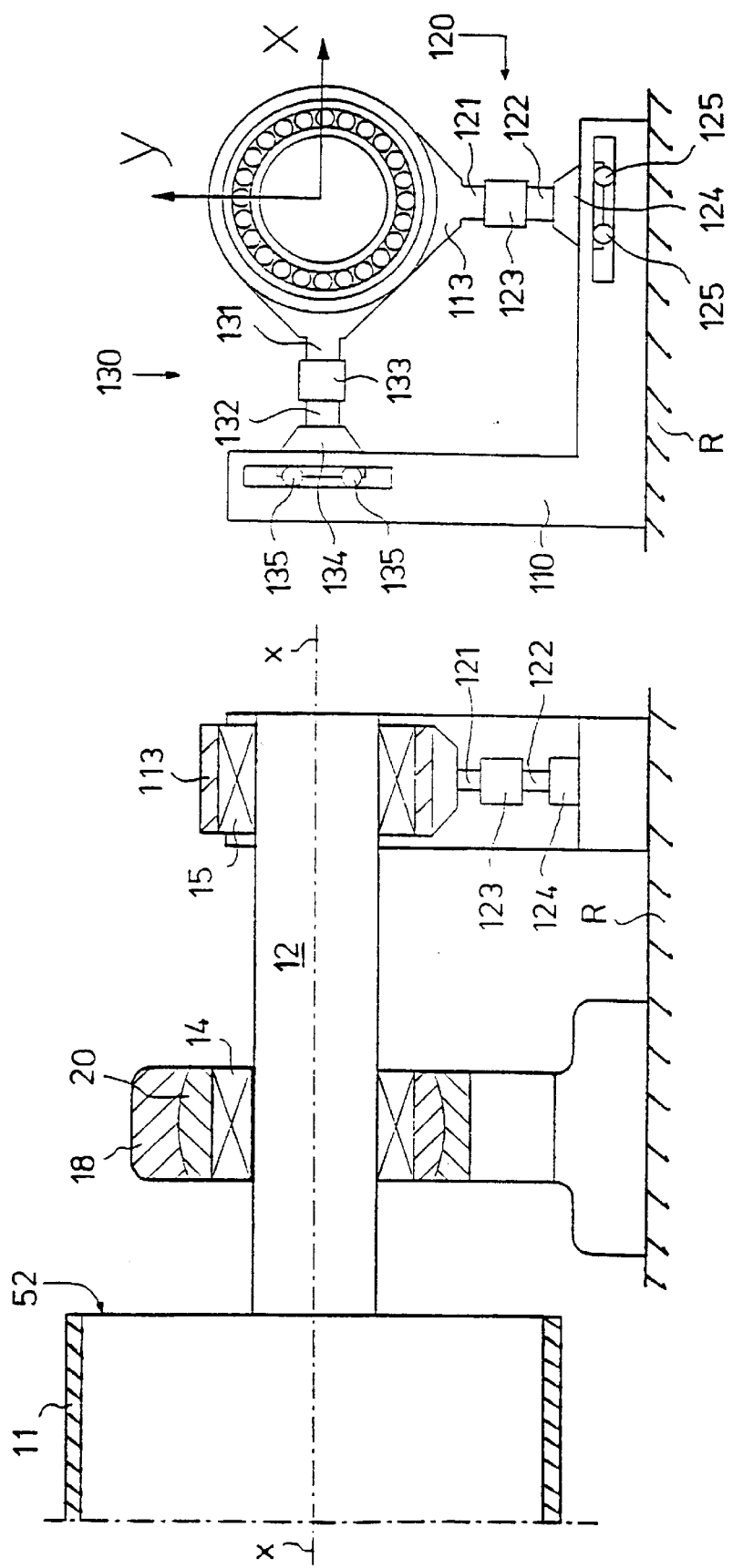
FIG. 10 is a schematic illustration of an embodiment of the roll in accordance with the invention, in which the bearings are fitted outside the roll mantle and the bending of the roll is carried out in two planes.

FIG. 10 shows an embodiment of the present invention, in which the bending takes place by means of two bending means 120,130 in two planes perpendicular to one another. The bending means 120,130 have been attached from one end to a substantially L-section support beam 110, which has again been attached to the frame R of the machine. On the other hand, the opposite ends of the bending means 120,130 have been attached to a flange 113 that surrounds the second bearing 15. The first bending device 120 displaces the axle journal 12 in the vertical plane Y, and the second bending device 130 displaces the axle journal 12 in the horizontal plane X. By means of this arrangement, the desired curve form of the roll can be regulated, e.g., by means of the first bending device 120, and the desired angular position of the curve form of the roll can be regulated by means of the second bending device 130.

The bending means 120,130 shown in FIG. 10 consist of a nut member 123,133 provided with inside threading, a first pin 121,131, which is fixed to a flange 113 and which is provided with an outside threading, being fitted to one end of said nut member, an second pin 122,132, which is fixed to a sledge 124,134 moving on the beam 110 and which is provided with an outside threading, being fitted to the opposite end of said nut member 123,133. When the nut member 123,133 is rotated, the axle journal 12 and, thereby, the roll mantle 11 can be bent in the X-Y-planes. By means of this arrangement, it is possible to regulate both the curve form of the roll mantle 11 and the angular position of said curve form. The sledge 124, which is fitted on the horizontal part of the beam 10, can move in the X-plane on support of the wheels 125, but it has been locked in respect of the beam 110 against movement in the Y-plane. In a corresponding way, the sledge 134 fitted on the vertical part of the beam 110 can move in the Y-plane on support of the wheels 135, but it has been locked in respect of the beam 110 against movement taking place in the X-plane. The wheels 125,135 of the sledges 124,134 revolve on guide rails or equivalent that have been formed on the beam 110. The wheel arrangement 125,135 is just one example of a mode in which the mounting of the sledges 124,134 on the beam 110 can be accomplished so that movement of the sledge 124 in the direction X and movement of the sledge 134 in the direction Y are permitted. In stead of a nut-pin solution, herein it is also possible to employ, for example, a hydraulic or pneumatic cylinder or a stepping motor.

Figure 11:
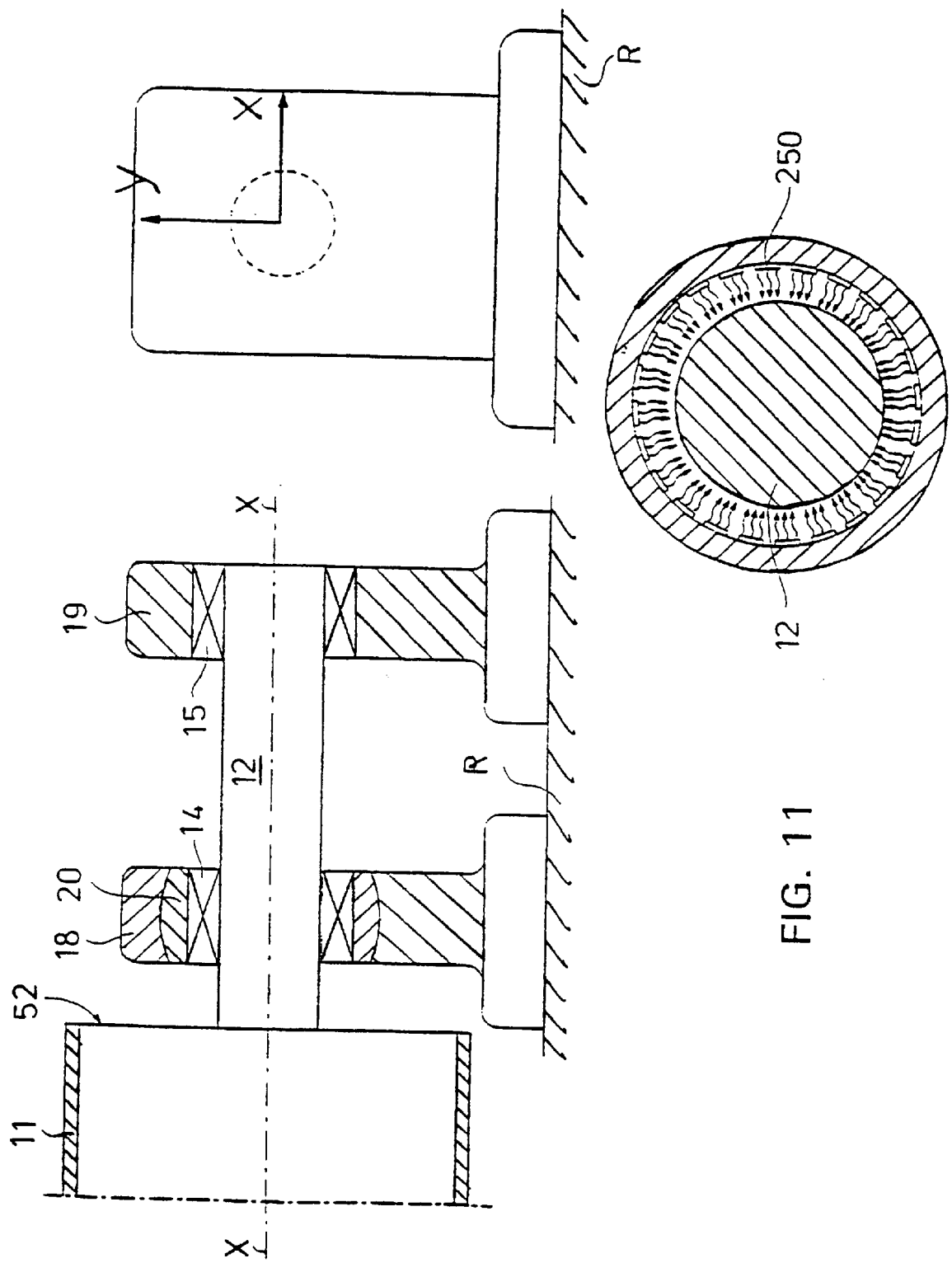
FIG. 11 shows a variation of the embodiment shown in FIG. 10.

FIG. 11 shows a variation of the embodiment shown in FIG. 10, in which the journalling and bending of the axle journal 12 are carried out by means of at least one magnetic bearing. At least one of the bearings 14,15 is a magnetic bearing 15, by whose means the axle journal 12 of the roll and, thereby, the roll mantle 11 can be bent. When the magnetic flux in the magnets 250 of the magnetic bearing 15 and, thereby, the force applied by the magnets 250 to the axle journal 12 are regulated, the axle journal 12 can be displaced eccentrically in relation to the housing. Thus, the magnetic bearing 15 permits bending of the roll axle 12 and, thus, also of the roll mantle 11 to the desired curve form in the X-Y-planes and regulating of the angular position of the arc of the roll mantle 11 formed by bending to the desired position. Of course both bearings 14,15 can also be magnetic bearings.

Figure 12:
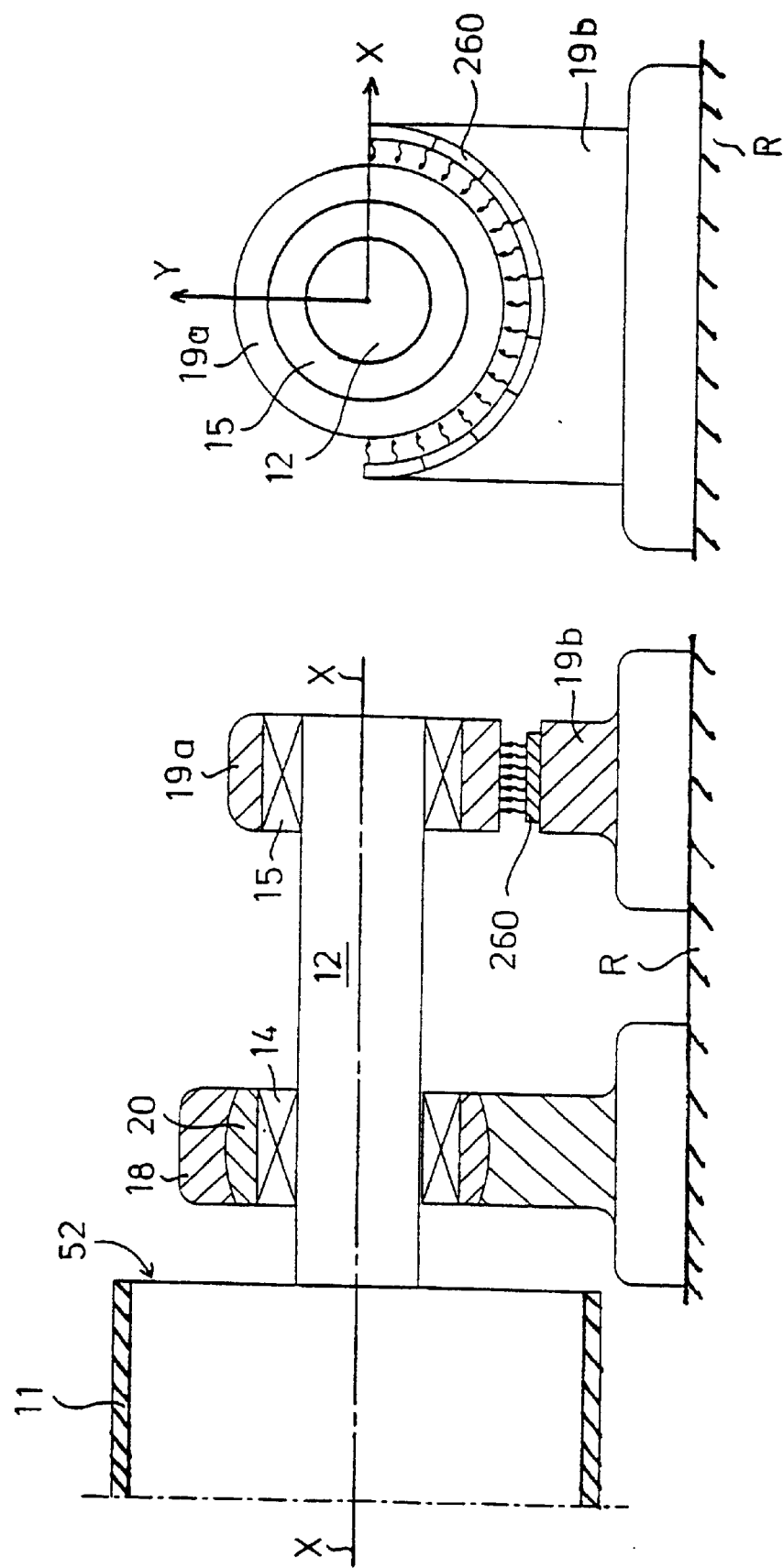
FIG. 12 shows a second variation of the embodiment shown in FIG. 10.

FIG. 12 shows a second variation of the embodiment shown in FIG. 10, in which the bending of the axle journal 12 and the angular position of the bending are regulated by means of a magnet 260. The flange 19a that surrounds the second bearing 15 and the base part 19b of the flange 19a, which is attached to the frame R of the machine, communicate with each other by means of the magnet 260. The magnet 260 consists of a number of sector-shaped parts, and the magnetic flux of each sector can be regulated separately. By means of such an arrangement, the axle journal 12 can be bent in the desired way in the X-Y-planes.

Figure 13:
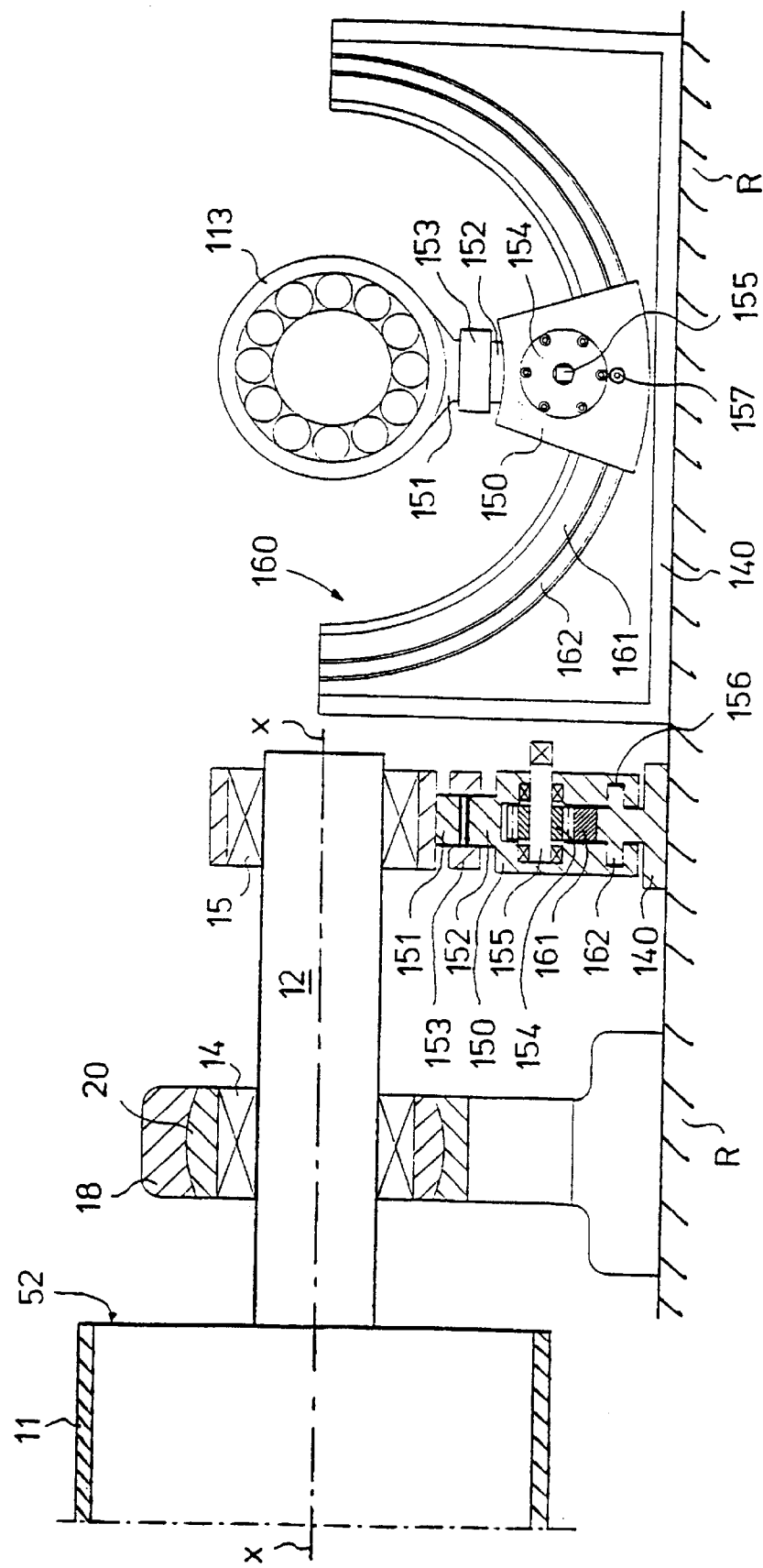
FIG. 13 shows a third variation of the embodiment shown in FIG. 10.

FIG. 13 shows a third variation of the embodiment shown in FIG. 10, in which the bending of the axle journal 12 is carried out by means of a nut member 153, and the angular position of the bending is regulated by means of a rack-gearwheel device 160, 150. The flange 113 which surrounds the second bearing 15 has been attached to the gearwheel device 150 by means of the nut member 153. The nut member 153, provided with an inside threading, is similar to the nut members 123,133 shown in FIG. 11, and to one of its ends a pin 151 projecting from the bearing flange 113 and provided with outside threading has been fitted, and to its opposite end a pin 152 projecting from the gearwheel device 150 and provided with outside threading has been fitted. The gearwheel device 150 comprises a gearwheel 154 mounted on the gearwheel device 150 by means of its shaft 155. The shaft 155 of the gearwheel 154 projects from the gearwheel device 150, and the projecting portion is preferably of quadrangular section, in which case it can be rotated, for example, by means of a lever tool suitable for the purpose. The rack device 160 comprises a rack 161 substantially shaped as an arc of a circle, along which the gearwheel 154 runs. The rack device 160 further comprises a guide part 162, which glides in the guide groove 156 of the gearwheel device 150. The rack device 160 is attached to the beam 140, which is again attached to the frame R of the machine. When the nut device 153 is rotated, the distance of the central axis X—X of the axle journal from the rack 161 can be regulated, in which way the axle journal 12 and, thereby, the roll mantle 11 can be bent. On the other hand, by means of the gearwheel 154 of the gearwheel device 150 it is possible to regulate the angular position of the curve form of the roll mantle 11. The gearwheel device 150 can be locked in the desired angular position on the rack 161 by means of a screw locking device 157, which tightens the sledge 150 against the rack 161.

Figure 14:
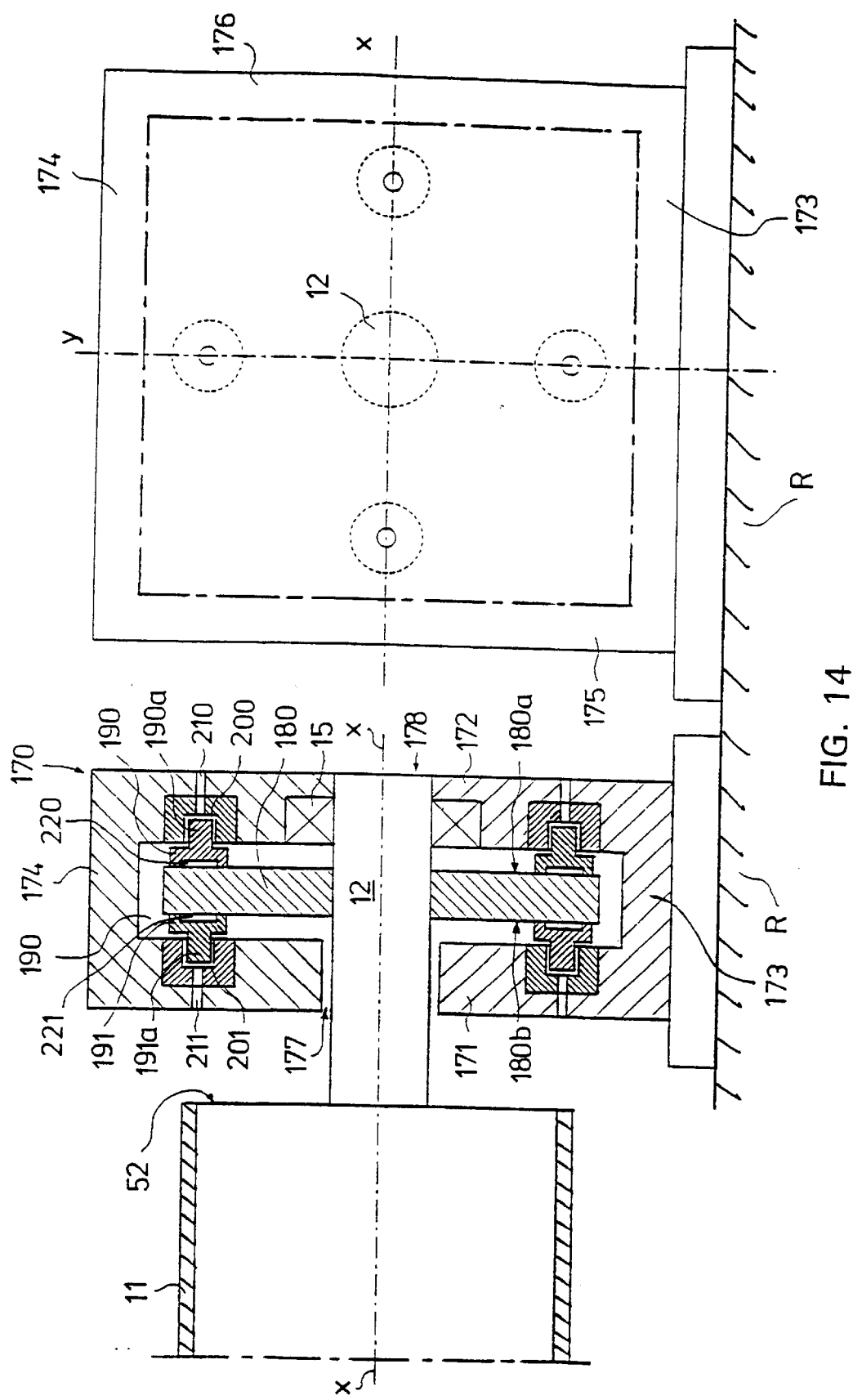
FIG. 14 is a schematic illustration of an embodiment of the roll in accordance with the invention, in which the bearings are fitted outside the roll mantle and the bending of the roll is carried out by means of a disk attached to the axle journal and by means of hydraulic loading elements acting upon said disk.

FIG. 14 shows an embodiment in accordance with the invention, in which the bending of the axle journal 12 is carried out by means of a disk member 180 attached to the axle journal 12. The fastening flange construction 170 attached to the frame R of the machine consists of two vertical walls of substantially rectangular shape placed at an axial distance from one another, i.e. a front wall 171 and a rear wall 172. The bottom edge and the top edge of the front wall 171 and of the rear wall 172 have been interconnected by means of a substantially rectangular horizontal bottom wall 173 and top wall 174. Similarly, the side edges of the front wall 171 and the rear wall 172 have been interconnected by means of a substantially rectangular vertical first side wall 175 and second side wall 176. The walls 171,172, 173, 174,175,176 define a hollow cavity space 190 in their interior, in which space the disk 180 attached to the axle journal 12 revolves along with the axle journal 12. The axle journal 12 extends through the hole 177 provided in the front wall 171 of the fastening flange construction 170 and through the hole 178 provided in the rear wall 172 and has been mounted revolvingly by means of a bearing 15 in the rear wall 172. The diameter of the hole provided in the front wall is larger than the outer diameter of the axle journal 12.

Further in the embodiment shown in FIG. 1, on the outer circumference of the disk 180 on its opposite side faces 180a, 180b, hydraulic loading elements 190,191 have been fitted, by whose means the disk 180 and, thereby, the axle journal 12 can be bent. The pistons 190a, 191a of the loading elements 190,191 move in cylinders 200, 201 which have been formed into the front wall 171 and the rear wall 172 of the fastening flange construction 170. To the bottoms of the cylinders 200,201, pressure medium ducts 210,211 pass. The pistons 190a, 191 a have been sealed in the cylinders 200,201 by means of sealing members known in themselves, which members are not shown in the figure. Also, thin capillary ducts (not shown in the figure) pass through the pistons 190a,191a into lubrication pockets 220, 221 of the loading elements 190,191. There are favourably four loading elements 190,191 on each face 180a,180b of the disk 180, i.e. a total of eight elements. The loading elements 190, 191 are placed at the intersection points between the circumference of a circle drawn at the centre of the axle journal 12, the X-axis, and the Y-axis.

In the embodiment as shown in FIG. 14, the axle journal 12 and, thereby, the roll mantle 11 are bent by means of the disk 180 attached to the axle journal 12 and by means of the hydraulic loading elements 190,191 acting upon said disk. By means of eight loading elements 190, 191, the roll mantle 11 can be bent to the desired curve form and to the desired angular position.

Figure 15:
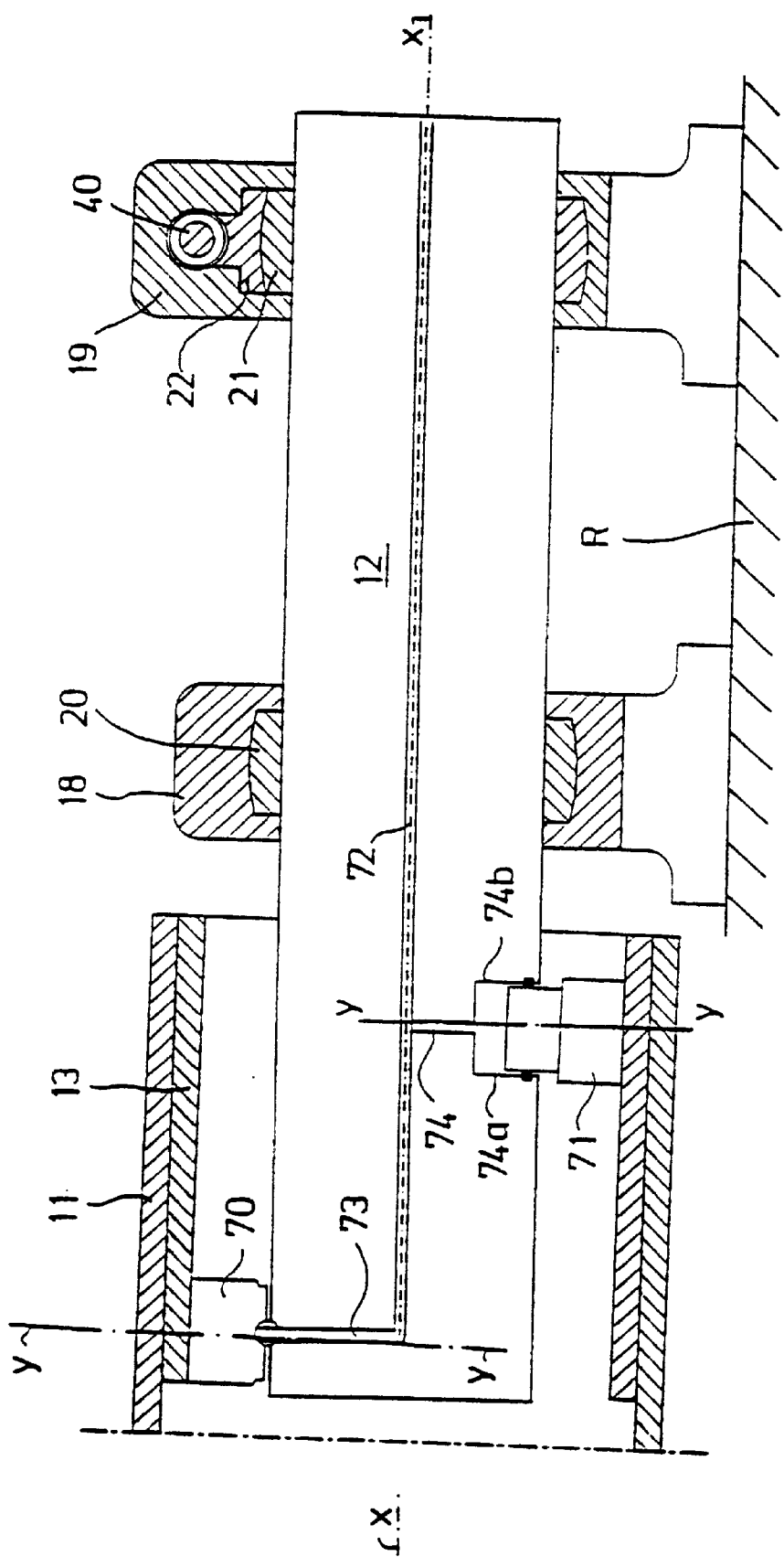
FIG. 15 is a schematic illustration of an embodiment of the roll in accordance with the invention in which glide bearings are employed in the interior of the roll mantle and in which the bending mechanism based on hydraulics is connected with the glide bearings.

FIG. 15 shows an embodiment which differs from the embodiments shown in the preceding figures in respect of the bending mechanism, the bearing-arrangement, and the axle journal. In this embodiment, the axle journal 12 is of substantially uniform thickness over its entire length, and it is not bent. The journalling of the axle journal 12 in a first support sleeve 13 fitted inside the roll mantle 11 has been arranged by means of hydrostatic or hydrodynamic glide bearings 70,71, on whose support the roll mantle 11 revolves in relation to the axle journals 12. The glide bearings 70,71 are placed at a distance from one another in the direction of the axis X—X of the roll. For the feed and return ducts of the hydraulic medium, a duct 72 parallel to the axis X—X of the axle journal has been made into the axle journal 12, together with radial ducts 73,74 at the locations of the glide bearings. The first bearing 70, which operates exclusively as a glide bearing, has been attached to the axle journal 12 by means of an articulated joint so that its central axis Y—Y can turn in relation to the radius of the axle journal 12.

In the embodiment shown in FIG. 15, in addition to the glide bearing property, the second bearing 71 has been provided with a possibility to displace the bearing in the direction of the radius of the axle journal 12. This second bearing 71 has been attached to the axle journal 12 so that it can move in the direction of the radius of the axle journal 12, and at the same time its central axis Y—Y can turn in relation to the radius of the axle journal 12. Into this second bearing 71, two separately controllable hydraulic feeds 74a,74b are passed. By means of this arrangement, it is possible to control the movement of the bearing 71 in relation to the radius of the axle journal 12. When the bearing 71 is shifted in relation to the radius of the axle journal 12, this produces a bending force applied to the roll mantle 11.

The alternative embodiment shown in FIG. 3, in which the bending device 30 is placed between the roll and the nearest fastening member 18, can, of course, also be applied to the embodiments shown in FIGS. 4 through 9.

In FIGS. 10 through 13, it is shown that the bending is carried out at the second, outer support point, in relation to the end 52 of the roll, but a reversed situation is also possible. In such a case, the bending mechanism is placed at the inner support point, and the outer support point is fixed.

In the embodiments shown in FIGS. 2 through 5, 7, 8, 10 and 13, the bending of the roll mantle 11 takes place by means of forced shifting by means of a screw 30,80, a screw-nut assembly 120,130,151 . . . 153, a wedge 70, or equivalent. The screw 30, 80, the screw-nut assembly 120, 130,151 . . . 153, the wedge 70, or equivalent binds the axle journal 12 with the support point rigidly, in which case the roll is, so to say, rigidly supported in the sense of vibration.

In the embodiments shown in, FIGS. 6, 9, 11, 12, and 14, the bending of the roll mantle 11 takes place by means of hydraulics, pneumatics, or by means of a stepping motor 100,101,190,250,260 in which case the roll is, so to say, freely supported or articulation-supported in the sense of vibration. A hydraulic medium and a pneumatic medium usually yield to some extent, in which case the support is provided with a slight extent of resilience.

In the embodiment shown in FIG. 15, the bending of the roll mantle 11 takes place directly from the roll mantle 11 from inside the support point of the axle journal 12. In this case the bearings 70,71 bind the roll with the first support sleeve 13 rigidly. Thus, also in this embodiment, the roll is rigidly supported in the sense of vibration.

In the case of rigid support, the lowest natural frequency of the roll becomes more than twice as high as compared with a freely supported roll. When the natural frequency of a roll becomes higher, it is possible to use smaller roll diameters, in which case the forces transferred from the bending to the frame of the machine are reduced and the cost of manufacture of the roll becomes lower.

In the following, the patent claims will he given, and the details of the invention may show variation within the scope of the inventive idea defined in said claims and differ from what has been stated above by way of example only.

What is claimed is:

1. A roll that can be bent for a web-like material having an axis (X—X), and a continuous tubular roll mantle (11) of a composite material having two opposite end portions, each end portion comprising:

an axle journal (12) having an inner part extending within the end portion of the roll mantle and an outer part protruding out from the end portion of the roll mantle, said inner part being attached to the respective end portion of the roll mantle (11);

an articulation member (16) provided on an outer face of the outer part of the axle journal (12);

a first support sleeve (13) extending within the end portion of the roll mantle and having an inner surface and an outer surface, said first support sleeve being fixed in the interior of the respective end portion of the roll mantle (11);

first and second fastening means (18,19) placed at a distance from one another in the direction of the axis (X—X) of the roll, said fastening means being fixed to a frame (R) of a machine incorporating the roll;

bearings (14,15) having inner races and outer races, the roll mantle (11) being journalled revolving by means of said bearings (14,15) placed at a distance from one another in the direction of the axis (X—X) of the roll, the outer races of said bearings (14,15) being supported on said first support sleeve (13) and the inner races of said bearings (14,15) being supported on the axle journal (12);

a second support sleeve (17) having an inner surface and an outer surface, said second support sleeve (17) surrounding the outer end of the axle journal (12) and extending in a direction of the axis (X—X) of the roll at least between said fastening means (18,19), the outer end of the axle journal (12) resting by means of the articulation member (16) against the inner surface of the second support sleeve (17) and the outer surface of the second support sleeve (17) being fixed in the fastening means (18,19); and a bending mechanism (30,70,100) arranged between the second support sleeve (17) and the axle journal (12) in order to displace the axle journal (12) in relation to the second support sleeve in a direction transverse to the direction of the axis (X—X) of the roll and thereby bend the roll mantle (11) into an arc form (FIGS. 2–6).

2. A roll as claimed in claim 1, wherein the articulation member (16) of the axle journal (12) is placed substantially at the first fastening means (18), the axle journal (12) being diverted by means of a bending mechanism (30,70,100) fitted substantially at or near the second fastening means (19) (FIGS. 2 and 4–6).

3. A roll as claimed in claim 2, wherein the bending mechanism comprises a screw member (30), being passed through the second support sleeve (17) and through the axle journal (112), said screw member (30) being locked against movement taking place in a direction of a longitudinal axis of the screw member (30) by means of fastening members (31, 32) supported against the outer surface of the second support sleeve (17) and attached to the screw member (30), said screw member (30) being provided with an outside threading substantially over the portion that extends through the second support sleeve (17), the bore receiving the screw member (30) in the axle journal (12) being provided with a corresponding inside threading, wherein the screw member (30) produces a torque which bends the axle journal (12), which torque again bends the roll mantle (11) (FIGS. 24).

4. A roll as claimed in claim 2, wherein the bending mechanism comprises a screw member (60) being provided with an outside threading, said screw member (60) being movable in the direction of the axis (X—X) of the roll, and being fitted in a fastening member (61) attached to the inner surface of the second support sleeve (17) and provided with a bore which is parallel to the axis (X—X) of the roll, said fastening member (61) being provided with an inside threading that receives the screw member (60), an end of the screw member (60) being placed against an end face of a first wedge member (70), said first wedge member (70) being movable along the inner surface of the second support sleeve (17) in a direction parallel to the axis (X—X) of the roll, but which first wedge member is locked against the inner surface of the second support sleeve (17) to prevent radial movement, a wedge face of said first wedge member (70) being supported against a wedge face of a second wedge member (71) attached to the axle journal (12), wherein pushing of the first wedge member (70) onto the second wedge member (71), with the screw member (60), produces a force that bends the axle journal (12), which force again bends the roll mantle (11) (FIG. 5).

5. A roll as claimed in claim 2, wherein the bending mechanism comprises a hydraulic cylinder, pneumatic cylinder or stepping motor (100) attached to the second support sleeve (17), a rod (101) of said cylinder or motor being attached to the axle journal (12), wherein movement of the rod (101) produces a force that bends the axle journal (12), which force again bends the roll mantle (11) (FIG. 6).

6. A roll as claimed in claim 1, wherein the articulation member (16) of the axle journal (12) is placed substantially at the location of the second fastening means (19), the axle journal (12) being diverted by means of a bending mechanism (30,70,100) fitted substantially at or near the location of the first fastening means (18) (FIG. 3).

7. A roll as claimed in claim 1, wherein the first (18) and second (19) support means are attached to a common lower part (90), said common lower part (90) being attached to the framed (R) of the machine incorporating the roll (FIG. 4).

8. A roll as claimed in claim 1, wherein a regulation device (40) is fitted onto the second fastening member (19), said regulating device (40) acting upon a bearing member (21) supported against the outer surface of the second support sleeve (17,51) by an intermediate of an intermediate member (22), wherein a movement of rotation of the regulation device (40) in a direction of a circumference of the roll produces a corresponding movement of rotation in the second support sleeve (17) and from it further, by an intermediate of the bending mechanism (30,60,80,100), in the axis journal (12) in order to control the radial direction of the bending arc of the roll mantle (11) (FIGS. 2–9).

9. A roll that can be bent for a web-like material having an axis (X—X), and a continuous tubular roll mantle (11) of a composite material having two opposite end portions, each end portion comprising:

an axle journal (12) having an outer face and being attached directly by means of an end member (52) to the respective end portion of the roll mantle (11); first and second fastening means (18,19) placed at a distance from one another in the direction of the axis (X—X) of the roll, said fastening means being fixed to a frame (R) of a machine incorporating the roll;

a first support sleeve (50) having an inner surface and an outer surface, said first support sleeve (50) surrounding the axle journal (12) and extending in the direction of the axis (X—X) of the roll from the first fastening means (18) to a distance outside the second fastening means (19), said extension beyond the second fastening means (19) forming an outer portion of the first support sleeve (50);

bearings (14,15) having inner races and outer races and being fitted substantially at a location of the fastening means (18,19), said axle journal (12) being journalled revolving by means of said bearings (14,15), the outer races of said bearings being supported on said first support sleeve (50) and the inner races of said bearings being supported on the axle journal (12);

a second support sleeve (51) having an inner surface and an outer surface, said second support sleeve (51) surrounding the first support sleeve (50) and having a thicker portion (51a) placed at the location of the first fastening means (18) and directed at the axle journal (12), which thicker portion (51a) forms an articulation member of the first support sleeve (50), said second support sleeve (51) extending in the direction of the axis (X—X) of the roll from the first fastening means (18) to a distance outside the second fastening means (19) and the outer surface of said second support sleeve (51) being fixed in the fastening means (18,19), said extension beyond the second fastening means (19) forming an outer portion of the second support sleeve (51); and a bending mechanism (60,70,80,100) arranged between the second support sleeve (51) and the first support sleeve (50) in order to displace the first support sleeve (50) in relation to the second support sleeve and thereby the axle journal (12) in a direction transverse to the direction of the axis (X—X) of the roll and thereby bend the roll mantle (11) into an arc form (FIGS. 7–9).

10. A roll as claimed in claim 9, wherein a screw member (80) being provided with an outside treading and having a longitudinal axes is fitted on the outer portions of the first and the second support sleeve (50,51), said screw member (80) passing through the first and the second support sleeves (50,51), movement of said screw member (80) in the direction of the longitudinal axis in relation to the first support sleeve (50) being prevented by means of first fastening members (81,82) attached to the screw member (80) and supported against the inner surface of the first support sleeve (50), said screw member (80) being connected with second fastening members (83,84) attached to the outer surface of the second support sleeve (51) and provided with bores having an inner threading receiving the outside threading on the screw member (80), said screw member (80) producing a torque which bends the first support sleeve (50) and thereby the axle journal (12), and which torque also bends the roll mantle (11) (FIG. 7).

11. A roll as claimed in claim 9, wherein a screw member (60) being provided with an outside treading is fitted to the outer portion of the second support sleeve (51), said screw member (60) being movable parallel to the axis (X—X) of the roll, and being fitted in a fastening member (61) attached to the inner surface of the second support sleeve (51) and provided with a bore parallel to the axis (X—X) of the roll having an inside threading receiving the screw member (60), wherein an end of the screw member (60) directed at the end portion of the roll mantle (11) is positioned against an end face of a first wedge member (70), said wedge member (70) being movable along an inner surface of the second support sleeve (51) in a direction parallel to the axis (X—X) of the roll, said first wedge member (70) being locked against the inner surface of the second support sleeve (51) to prevent radial movement, a wedge face of said first wedge member (70) being supported against a wedge face of a second wedge member (71) attached to the outer surface of the first support sleeve (50), said first wedge member (70) being pushed onto the second wedge member (71) with the screw member (60) produces a torque that bends the first support sleeve (50) and thereby the axle journal (12), which torque again bends the roll mantle (11) (FIG. 8).

12. A roll as claimed in claim 9, wherein a hydraulic cylinder, pneumatic cylinder or stepping motor (100) is fitted onto the outer portions of the first and the second support sleeve (50,51), said cylinder or motor being attached to the second support sleeve (51), said cylinder or motor having a rod (101) being attached to the first support sleeve (50), wherein movement of the rod (101) produces a torque, which bends the first support sleeve (50) and thereby the axle journal (12), and which torque also bends the roll mantle (11) (FIG. 9).

13. A roll that can be bent for a web-like material having an axis (X—X), and a continuous tubular roll mantle (11) of a composite material having two opposite end portions, each end portion comprising:

an axle journal (12) having an outer face and being attached directly by means of an end member (52) to the respective end portion of the roll mantle (11);

first and second fastening means (18, 110) placed at a distance from one another in the direction of the axis (X—X) of the roll, said fastening means being fixed to a frame (R) of a machine incorporating the roll and said second fastening means (110) being L-shaped;

bearings (14,15) having inner races and outer races, said axle journal (12) being journalled revolving by means of said bearings (14,15), the outer race of a first bearing being supported on the first fastening means (18) and the outer race of a second bearing being supported on the second fastening means (110), the inner races of the first (14) and second (15) bearings being supported on the axle journal (12);

a bending mechanism (120, 130) being arranged between the second fastening means (110) and the axle journal (12) in order to displace the axle journal (12) in relation to the second fastening means in a direction transverse to the direction of the axis (X—X) of the roll and thereby bend the roll mantle (11) into an arc form; and wherein the bending mechanism comprises, substantially in a vertical plane (Y), a first regulation mechanism (120) fitted between a horizontal part of the L-shaped second fastening means (110) and a flange (113) that surrounds the second bearing (15) and, substantially in a horizontal plane (X), a second regulation mechanism (130) fitted between a vertical part of the L-shaped second fastening means (110) and the flange (113) that surrounds the second bearing (15) (FIG. 10).

14. A roll as claimed in claim 13, wherein the first (120) and the second (130) regulation mechanism comprise a first pin (121,131) being attached to the flange (113) and provided with an outside threading, and a second, opposite pin (122,132) being attached to a sledge (124,134) moving on the fastening member (110) and being provided with an outside threading, said opposite pins (121,122,131,132) being interconnected by means of a nut member (123,133) provided with an inside threading, by means of which nut member (123,133) the curve form of the roll mantle (11) and the angular position of the curve form of the roll mantle (11) is regulated (FIG. 10).

15. A roll that can be bent for a web-like material having an axis (X—X), and a continuous tubular roll mantle (11) of a composite material having two opposite end portions, each end portion comprising:

an axle journal (12) having an outer face and being attached directly by means of an end member (52) to the respective end portion of the roll mantle (11);

first and second fastening means (18, 19) placed at a distance from one another in the direction of the axis (X—X) of the roll, said fastening means being fixed to a frame (R) of a machine incorporating the roll;

bearings (14,15) having inner races and outer races, said axle journal (12) being journalled revolving by means of said bearings (14,15), the outer race of a first bearing being supported on the first fastening means (18) and the outer race of a second bearing being supported on the second fastening means (19,19a,113), the inner races of first (14) and second (15) bearings being supported on the axle journal (12);

a bending mechanism (250) being arranged between the second fastening means (19) and the axle journal (12) in order to displace the axle journal (12) in relation to the second fastening means in a direction transverse to the direction of the axis (X—X) of the roll and thereby bend the roll mantle (11) into an arc form; and wherein at least the second bearing (15) is a magnetic bearing (250), by whose means the curve form of the roll mantle (11) and the angular position of the curve form of the roll mantle (11) is regulated (FIG. 11).

16. A roll that can be bent for a web-like material having an axis (X—X), and a continuous tubular roll mantle (11) of a composite material having two opposite end portions, each end portion comprising:

an axle journal (12) having an outer face and being attached directly by means of an end member (52) to the respective end portion of the roll mantle (11);

first and second fastening means (18, 19b) placed at a distance from one another in the direction of the axis (X—X) of the roll, said fastening means being fixed to a frame (R) of a machine incorporating the roll;

bearings (14,15) having inner races and outer races, said axle journal (12) being journalled revolving by means of said bearings (14,15), the outer race of a first bearing being supported on the first fastening means (18) and the outer race of a second bearing being supported on the second fastening means (19,19a,113), the inner races of first (14) and second (15) bearings being supported on the axle journal (12);

a bending mechanism (260) being arranged between the second fastening means (19b) and the axle journal (12) in order to displace the axle journal (12) in a direction transverse to the direction of the axis (X—X) of the roll and thereby bend the roll mantle (11) into an arc form; and wherein a flange (19a) that surrounds the second bearing (15) the second fastening means (19b) communicate with each other by means of a magnet (260), by whose means the curve form of the roll mantle (11) and the angular position of the curve form of the roll mantle (11) is regulated (FIG. 12).

17. A roll that can be bent for a web-like material having an axis (X—X), and a continuous tubular roll mantle (11) of a composite material having two opposite end portions, each end portion comprising:

an axle journal (12) having an outer face and being attached directly by means of an end member (52) to each end portion of the roll mantle (11);

first and second fastening means (18, 140) placed at a distance from one another in the direction of the axis (X—X) of the roll, said fastening means being fixed to a frame (R) of a machine incorporating the roll;

bearings (14,15) having inner races and outer races, said axle journal (12) being journalled revolving by means of said bearings (14,15), the outer race of a first bearing being supported on the first fastening means (18) and the outer race of a second bearing being supported on the second fastening means (140), the inner races of first (14) and second (15) bearings being supported on the axle journal (12);

a bending mechanism (153) being arranged between the second fastening means (140) and the axle journal (12) in order to displace the axle journal (12) in relation to the second fastening means in a direction transverse to the direction of the axis (X—X) of the roll and thereby bend the roll mantle (11) into an arc form; and wherein a first pin (151) provided with an outside threading is attached to a fastening flange (113) of the second bearing (15), and a second, opposite pin (152) provided with an outside threading is attached to a gearwheel device (150) moving on the second fastening means (140), said opposite pins (151,152) being interconnected by means of a nut member (153) provided with an inside threading, a gearwheel (154) of a gearwheel device (150) is movable along a rack (161), shaped as an arc of a circle, of a rack device (160) attached to the second fastening means (140), the curve form of the roll mantle (11) being regulated by means of the nut member (153), and the angular position of the curve form of the roll mantle (11) being regulated by means of the gearwheel-rack device (150,160) (FIG. 13).

18. A roll that can be bent for a web-like material having an axis (X—X), and a continuous tubular roll mantle (11) of a composite material having two opposite end portions, each end portion comprising:

an axle journal (12) having an outer face and being attached directly by means of an end member (52) to each end portion of the roll mantle (11);

a fastening flange construction (170) being attached to a frame (R) of a machine incorporating the roll, said flange construction comprising two substantially rectangular vertical walls, a front wall (171) and a rear wall (172), placed at a distance from one another in a direction of the axis (X—X) of the roll, a bottom edge and a top edge of said walls (171,172) being interconnected by means of substantially rectangular horizontal walls, a bottom wall (173) and a top wall (174), said walls (171,172) having side edges being interconnected by means of substantially rectangular vertical walls, a first side wall (175) and a second side wall (176), the walls (171,172,173,174,175,176) defining a hollow cavity space (190), in which a disk (180) attached to the axle journal (12) revolves along with the axle journal (12), which axle journal (12) extends through a hole (177) provided in the front wall (171) of the fastening flange construction (170) and through a hole (178) provided in the rear wall (172) and is journalled revolving by means of a bearing (15) in the rear wall (172); and wherein said fastening flange construction (170) further comprises loading elements (190,191) acting upon opposite faces (180a,180b) of the disk (180), by means of which loading elements the disk (180) and, thereby, the axle journal (12) and, thereby further, the roll mantle (11) is bent into a curve form, and the angular position of the arc of the roll mantle (11) is regulated (FIG. 14).

19. A roll that can be bent for a web-like material having an axis (X—X), and a continuous tubular roll mantle (11) of a composite material having two opposite end portions, each end portion comprising:

an axle journal (12) having an inner part extending within the end portion of the roll mantle and an outer part protruding out from the end portion of the roll mantle, said inner part being attached to the respective end portion of the roll mantle (11);

first and second fastening means (18,19) placed at a distance from one another in the direction of the axis (X—X) of the roll, said fastening means being fixed to a frame (R) of a machine incorporating the roll, the outer part of said axle journal (12) being supported by said first and said second fastening means (18,19);

a support sleeve (13) having an inner surface and an outer surface and being fitted in the interior of each end portion of the roll mantle (11); and hydrostatic or hydrodynamic glide bearings (70,71) having a central axis (Y—Y) and being arranged between the inner part of the axle journal (12) and the support sleeve (13) and supporting the axle journal (12) to the support sleeve (13), said roll mantle (11) being journalled revolving by means of said glide bearings (70, 71) on the axle journal (12), said bearings (70,71) also forming a bending mechanism by which the roll mantle (11) is bent into a curve form, said glide bearings (70,71) acting upon the support sleeve (13) supported against the axle journal (12), which glide bearings (70,71) have been attached to the axle journal (12) so that the central axes (Y—Y) of the glide bearings (70,71) are rotatable in relation to a radial direction of the axle journal (FIG. 15).

20. A roll as claimed in claim 19, wherein into one of the hydraulic glide bearings (71), hydraulic medium is supplied by means of two separately controllable feeds (74a,74b), wherein one of the hydraulic glide bearings (71) is displaced in the direction of a radius of the axis of the roll so that the central axis (Y—Y) of the glide bearing (71) forms an angle in relation to the radial direction of the axis of the roll, as a result of which the roll mantle (11) bends (FIG. 15).

21. A roll as claimed in claim 20, wherein the second fastening member (19) is provided with a regulation device (40), which acts upon a bearing member (21) supported against the outer face of the axle journal (12) by an intermediate of an intermediate member (22), wherein a movement of rotation of the regulation device (40) in the direction of a circumference of the roll produces a corresponding movement of rotation in the axle journal (12) in order to control the radial direction of the bending arc of the roll mantle (11) (FIG. 15).

* * * * *